United States Patent
Tsai et al.

(10) Patent No.: US 12,461,279 B2
(45) Date of Patent: Nov. 4, 2025

(54) PLASTIC LIGHT-FOLDING ELEMENT, IMAGING LENS ASSEMBLY MODULE AND ELECTRONIC DEVICE

(71) Applicant: LARGAN PRECISION CO., LTD., Taichung (TW)

(72) Inventors: Wen-Yu Tsai, Taichung (TW); Chien-Pang Chang, Taichung (TW); Ming-Ta Chou, Taichung (TW); Kuo-Chiang Chu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 660 days.

(21) Appl. No.: 17/711,168

(22) Filed: Apr. 1, 2022

(65) Prior Publication Data

US 2022/0373715 A1 Nov. 24, 2022

Related U.S. Application Data

(60) Provisional application No. 63/191,366, filed on May 21, 2021.

(30) Foreign Application Priority Data

Aug. 18, 2021 (TW) .................................. 110130558

(51) Int. Cl.
*G02B 1/00* (2006.01)
*G02B 1/04* (2006.01)
(Continued)

(52) U.S. Cl.
CPC ............... *G02B 1/041* (2013.01); *G02B 1/10* (2013.01); *G02B 13/0065* (2013.01); *H04N 23/55* (2023.01)

(58) Field of Classification Search
CPC ...... G02B 1/041; G02B 1/10; G02B 13/0065; G02B 5/04; G02B 5/0858; H04N 23/55; G03B 17/17; G03B 30/00
(Continued)

(56) References Cited

U.S. PATENT DOCUMENTS 6,175,450 B1 1/2001 Andreani et al.
6,493,144 B2 12/2002 Tanaka et al.
(Continued)

FOREIGN PATENT DOCUMENTS

TW 202113424 A 4/2021

*Primary Examiner* — Henry Duong
(74) *Attorney, Agent, or Firm* — McClure, Qualey & Rodack, LLP

(57) ABSTRACT

A plastic light-folding element includes an incident surface, an exit surface, a reflective surface and a reflective optical layer. The incident surface and the exit surface are configured to lead an imaging light enter and exit the plastic light-folding element, respectively. The reflective surface is configured to fold the imaging light. The reflective optical layer is disposed on the reflective surface, and includes an Ag layer, a bottom layer optical film and a top layer optical film. The bottom layer optical film is contacted with the Ag layer, and the bottom layer optical film is closer to the reflective surface than the Ag layer to the reflective surface. A refractive index of the top layer optical film is lower than a refractive index of the bottom layer optical film, and the top layer optical film is not contacted with the Ag layer.

9 Claims, 17 Drawing Sheets

(51) Int. Cl.
*G02B 1/10* (2015.01)
*G02B 13/00* (2006.01)
*H04N 23/55* (2023.01)

(58) Field of Classification Search
USPC .................................................. 359/642
See application file for complete search history.

(56) References Cited

U.S. PATENT DOCUMENTS

| | | |
|---|---|---|
| 6,926,952 B1 | 8/2005 | Weber et al. |
| 6,972,136 B2 | 12/2005 | Koenig et al. |
| 7,301,695 B2 | 11/2007 | Otani et al. |
| 7,336,421 B2 | 2/2008 | Tanaka |
| 8,125,714 B2 | 2/2012 | Yamada et al. |
| 8,189,261 B2 | 5/2012 | Tomoda |
| 8,199,404 B2 | 6/2012 | Yamada et al. |
| 8,248,699 B2 | 8/2012 | Terayama |
| 8,709,582 B2 | 4/2014 | Zheng et al. |
| 8,840,257 B2 | 9/2014 | Kawagishi et al. |
| 8,908,275 B2 | 12/2014 | Fukagawa et al. |
| 8,980,431 B2 | 3/2015 | Mori et al. |
| 8,982,466 B2 | 3/2015 | Neuffer |
| 9,069,125 B2 | 6/2015 | Hirasawa et al. |
| 9,158,039 B2 | 10/2015 | Okuno et al. |
| 9,194,987 B2 | 11/2015 | Wei |
| 9,201,172 B2 | 12/2015 | Fujii et al. |
| 9,291,748 B2 | 3/2016 | Momoki et al. |
| 9,296,648 B2 | 3/2016 | Henn et al. |
| 9,310,525 B2 | 4/2016 | Shibuya et al. |
| 9,316,810 B2 | 4/2016 | Mercado |
| 9,323,030 B2 | 4/2016 | Nie et al. |
| 9,377,397 B2 | 6/2016 | Wang et al. |
| 9,405,044 B2 | 8/2016 | Okuno |
| 9,581,733 B2 | 2/2017 | Tamada et al. |
| 9,625,620 B2 | 4/2017 | Beinat et al. |
| 9,709,704 B2 | 7/2017 | Miyahara et al. |
| 9,817,155 B2 | 11/2017 | Neuffer |
| 10,168,452 B2 | 1/2019 | Uchida et al. |
| 10,353,117 B2 | 7/2019 | Abe |
| 10,934,038 B2 | 3/2021 | Last |
| 2002/0030900 A1* | 3/2002 | Tominaga ........... B29C 45/2708 |
| | | 425/470 |
| 2007/0040966 A1* | 2/2007 | Teramoto ............. G02B 5/0808 |
| | | 349/113 |

* cited by examiner

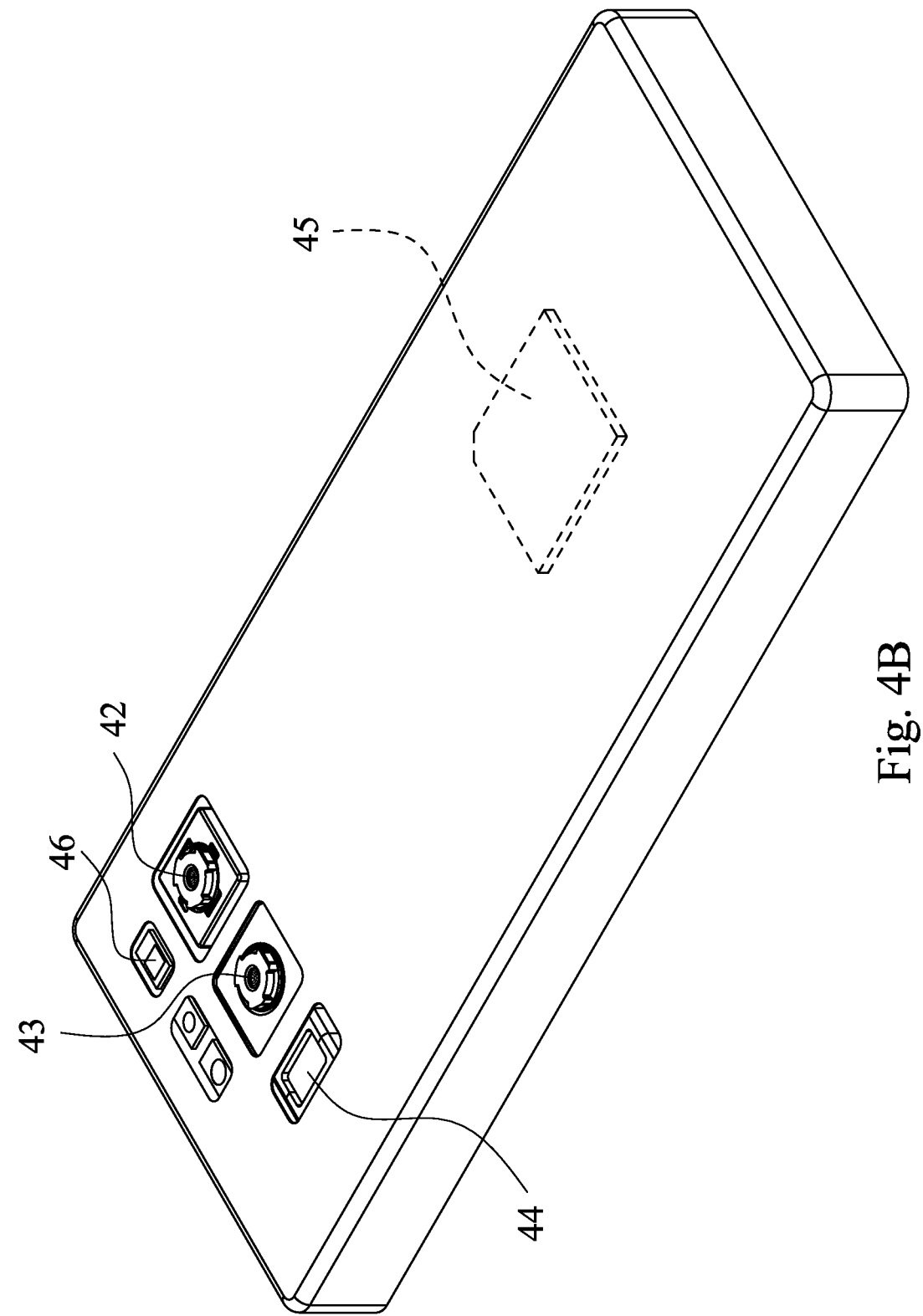

PLASTIC LIGHT-FOLDING ELEMENT, IMAGING LENS ASSEMBLY MODULE AND ELECTRONIC DEVICE

RELATED APPLICATIONS

This application claims priority to U.S. Provisional Application Ser. No. 63/191,366, filed May 21, 2021 and Taiwan Application Serial Number 110130558, filed Aug. 18, 2021, which are herein incorporated by reference.

BACKGROUND

Technical Field

The present disclosure relates to a plastic light-folding element and an imaging lens assembly module. More particularly, the present disclosure relates to a plastic light-folding element and an imaging lens assembly module applicable to portable electronic devices.

Description of Related Art

In recent years, portable electronic devices have developed rapidly. For example, intelligent electronic devices and tablets have been filled in the lives of modern people, and imaging lens assembly modules and plastic light-folding elements thereof mounted on portable electronic devices have also prospered. However, as technology advances, the quality requirements of the plastic light-folding elements are becoming higher and higher. Therefore, a plastic light-folding element, which can enhance the degree of the image restoration, needs to be developed.

SUMMARY

According to one aspect of the present disclosure, a plastic light-folding element includes an incident surface, an exit surface, a reflective surface and a reflective optical layer. The incident surface is configured to lead an imaging light enter the plastic light-folding element. The exit surface is configured to lead the imaging light exit the plastic light-folding element. The reflective surface is configured to fold the imaging light. The reflective optical layer is disposed on a surface of the reflective surface. The reflective optical layer includes an Ag layer, a bottom layer optical film and a top layer optical film. The Ag layer is configured to lead the imaging light, which enters the incident surface, reflect to the exit surface. The bottom layer optical film is directly contacted with the Ag layer, and the bottom layer optical film is closer to the reflective surface of the plastic light-folding element than the Ag layer to the reflective surface of the plastic light-folding element. A refractive index of the top layer optical film is lower than a refractive index of the bottom layer optical film, wherein the top layer optical film is not directly contacted with the Ag layer, and the top layer optical film is farther from the reflective surface of the plastic light-folding element than the Ag layer from the reflective surface of the plastic light-folding element. When the refractive index of the bottom layer optical film is Nb, a thickness of the bottom layer optical film is db, the refractive index of the top layer optical film is Nt, a thickness of the top layer optical film is dt, a thickness of the Ag layer is dAg, and the following conditions are satisfied: $1.4 < Nt < Nb < 2.1$; $1.6 < Nb < 2.1$; $1.4 < Nt < 1.58$; $0.05 < db/dAg < 1.2$; and $0.2 < dAg/dt < 3.5$.

According to one aspect of the present disclosure, an imaging lens assembly module includes the plastic light-folding element of the aforementioned aspect and an optical imaging lens assembly, wherein the plastic light-folding element is disposed on one of an object side and an image side of the optical imaging lens assembly.

According to one aspect of the present disclosure, an electronic device includes the imaging lens assembly module of the aforementioned aspect and an image sensor, wherein the image sensor is disposed on an image surface of the imaging lens assembly module.

BRIEF DESCRIPTION OF THE DRAWINGS

FIG. 4B is another schematic view of the electronic device according to the 4th example in FIG. 4A.

DETAILED DESCRIPTION

Figure 1A:
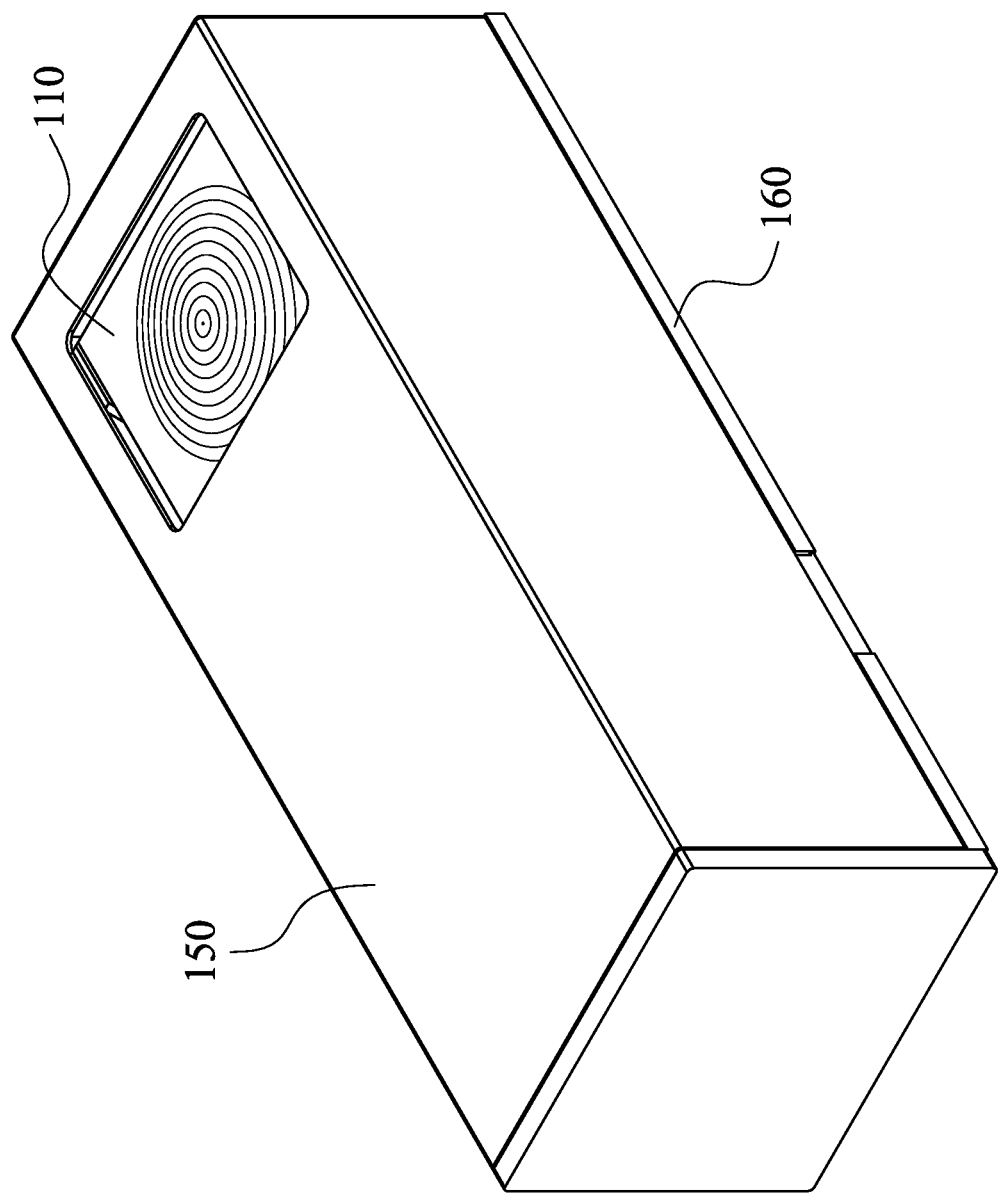
FIG. 1A is a three dimensional view of an electronic device according to the 1st example of the present disclosure.

The present disclosure provides a plastic light-folding element, and the plastic light-folding element includes an incident surface, an exit surface, a reflective surface and a reflective optical layer. The incident surface is configured to lead an imaging light enter the plastic light-folding element. The exit surface is configured to lead the imaging light exit the plastic light-folding element. The reflective surface is configured to fold the imaging light. The reflective optical layer is disposed on a surface of the reflective surface, and the reflective optical layer includes an Ag layer, a bottom layer optical film and a top layer optical film. The Ag layer is configured to lead the imaging light, which enters the incident surface, reflect to the exit surface. The bottom layer optical film is directly contacted with the Ag layer, and the bottom layer optical film is closer to the reflective surface of the plastic light-folding element than the Ag layer to the reflective surface of the plastic light-folding element. A refractive index of the top layer optical film is lower than a refractive index of the bottom layer optical film, wherein the top layer optical film is not directly contacted with the Ag layer, and the top layer optical film is farther from the reflective surface of the plastic light-folding element than the Ag layer from the reflective surface of the plastic light-folding element. When the refractive index of the bottom layer optical film is Nb, a thickness of the bottom layer optical film is db, the refractive index of the top layer optical film is Nt, a thickness of the top layer optical film is dt, and a thickness of the Ag layer is dAg, the following conditions are satisfied: $1.4<Nt<Nb<2.1$; $1.6<Nb<2.1$; $1.4<Nt<1.58$; $0.05<db/dAg<1.2$; and $0.2<dAg/dt<3.5$.

In particular, the plastic light-folding element of the present disclosure is an optical element disposing the Ag layer on the reflective surface made of a plastic material for folding the imaging light. The physical adhesion between the Ag layer and the reflective surface made of the plastic material is enhanced via the bottom layer optical film, and the higher refractive index can be maintained via the bottom layer optical film so as to reduce the unnecessary reflection inside the plastic light-folding element to increase the image restoration of the imaging light.

The plastic light-folding element can further include a connecting surface and a gate vestige structure. The connecting surface is connected to the incident surface, the exit surface and the reflective surface. The gate vestige structure is disposed on the connecting surface. The injecting efficiency of the injection molding can be enhanced by disposing the gate vestige structure on the connecting surface, and the better optical flatness and the better circular symmetry consistency of the incident surface, the exit surface and the reflective surface can be obtained by simultaneously forming the incident surface, the exit surface and the reflective surface.

The bottom layer optical film can be a metal oxide layer. In particular, the metal oxide layer includes a metal material, the stronger binding force between the metal oxide layer and the Ag layer and the stronger binding force between the metal oxide layer and the plastic material can be simultaneously obtained, and hence the binding force between the bottom layer optical film made of the metal oxide and the metal material is higher than the binding force between the bottom layer optical film made of the non-metal oxide and the metal material. In other words, the better adhesion of the Ag layer to the plastic material can be obtained via the metal oxide layer. It should be mentioned that an ordinary adhesive test is to stick the tape on a surface of the optical layer and then tear off the tape to check the surface condition of the optical layer, and the quality of the adhesion is determined via the surface condition of the optical layer, wherein the more serious test condition can be obtained by increasing the numbers of sticking and tearing off the tape, but the present disclosure is not limited thereto. In particular, the bottom layer optical film can be made of $Al_2O_3$, the top layer optical film can be made of a non-metal oxide, such as $SiO_2$.

The plastic light-folding element can further include at least one intermediate layer, wherein the intermediate layer is disposed between the top layer optical film and the Ag layer. Via the intermediate layer, the Ag layer can be protected so that the Ag layer is not easily oxidized, and the ability of the resistant to the corrosion of acid and alkali of the Ag layer can be enhanced, but the effect of the intermediate layer is not limited thereto.

The intermediate layer can include a metal layer excluding a silver atom. In particular, the material of the metal layer can be Ti, Cr, Ni and so on, but the present disclosure is not limited thereto. The surface stability of the Ag layer can be enhanced via the metal layer excluding the silver atom so that the Ag layer is not easily influenced by the external environment, and the combination between the Ag layer and the metal layer excluding the silver atom is better.

The bottom layer optical film can be directly contacted with the reflective surface of the plastic light-folding element. Therefore, the degree of the optical reflection of the Ag layer can be enhanced to maintain the higher optical reflectivity. In particular, the degree of the optical reflection of the silver atom is better than the degree of the optical reflection of the aluminum atom, and the reflecting effect of the Ag layer can be not easily influenced and decreased via the plastic material by disposing the bottom layer optical film.

When the thickness of the Ag layer is dAg, the following condition can be satisfied: $75\ nm<dAg<200\ nm$. The reflecting effect of the imaging light can be better via the Ag layer with the proper thickness, and the degree of the reflection of the light wavelengths of the different imaging light bands can be more consistent. Therefore, the better degree of the restored image of the imaging light can be obtained, and the reflecting image can be more delicate, more realistic and gentler. It should be mentioned that the inconsistent thickness of the Ag layer with the excessively thick is easily obtained so that the distortion of the reflecting image is caused.

When the thickness of the bottom layer optical film is db, and the thickness of the top layer optical film is dt, the following condition can be satisfied: $0.05<db/dt<1.1$. The better optical characteristic of the plastic light-folding element can be obtained by the thinner bottom layer optical film. In particular, the optical characteristic can be the color rendering of the image light, the restoring degree of the image light or the detail of the image light, but the present disclosure is not limited thereto.

When a lowest reflectivity of a reflectivity of the reflective optical layer between wavelengths of 540 nm to 590 nm is R5459, the following condition can be satisfied: $94.0\%<R5459<99.99\%$. By the high reflectivity of the visible light band, the authenticity of the image can be faithfully presented, and the addition loss of the original light by the plastic light-folding element can be reduced to enhance the imaging quality.

Each of the aforementioned features of the plastic light-folding element can be utilized in various combinations for achieving the corresponding effects.

The present disclosure provides an imaging lens assembly module, which includes the aforementioned plastic light-folding element and an optical imaging lens assembly, wherein the plastic light-folding element is disposed on one of an object side and an image side of the optical imaging lens assembly. In particular, the imaging lens assembly module can be applied to the telephoto (that is, the full view is less than 40 degrees) by the disposition of the plastic light-folding element. Therefore, the volume of the imaging lens assembly module can be effectively reduced.

The present disclosure provides an electronic device, which includes the aforementioned imaging lens assembly module and an image sensor, wherein the image sensor is disposed on an image surface of the imaging lens assembly module.

According to the aforementioned embodiment, specific examples are provided, and illustrated via figures.

1st Example

Figure 1B:
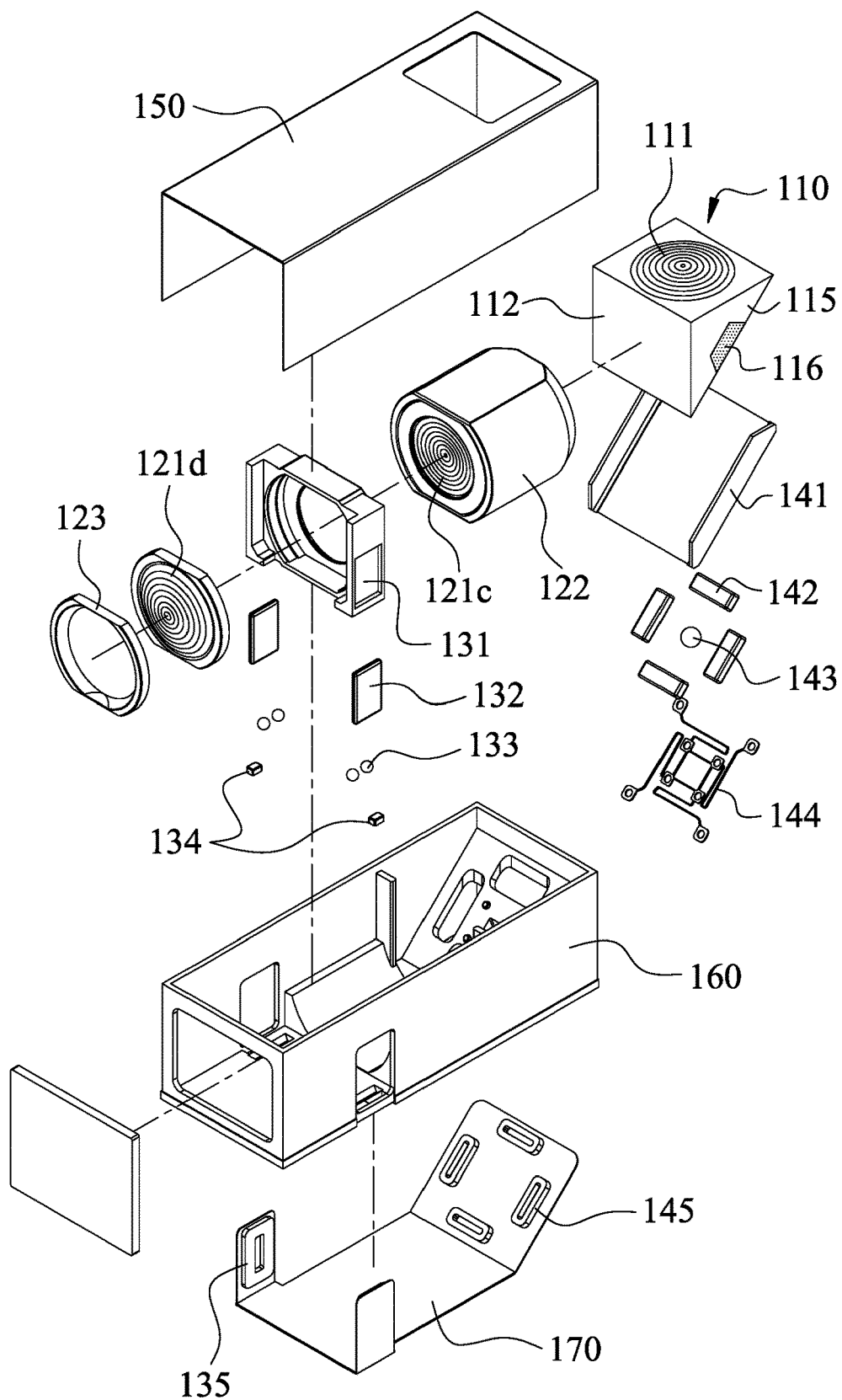
FIG. 1B is an exploded view of the electronic device according to the 1st example in FIG. 1A.
Figure 1C:
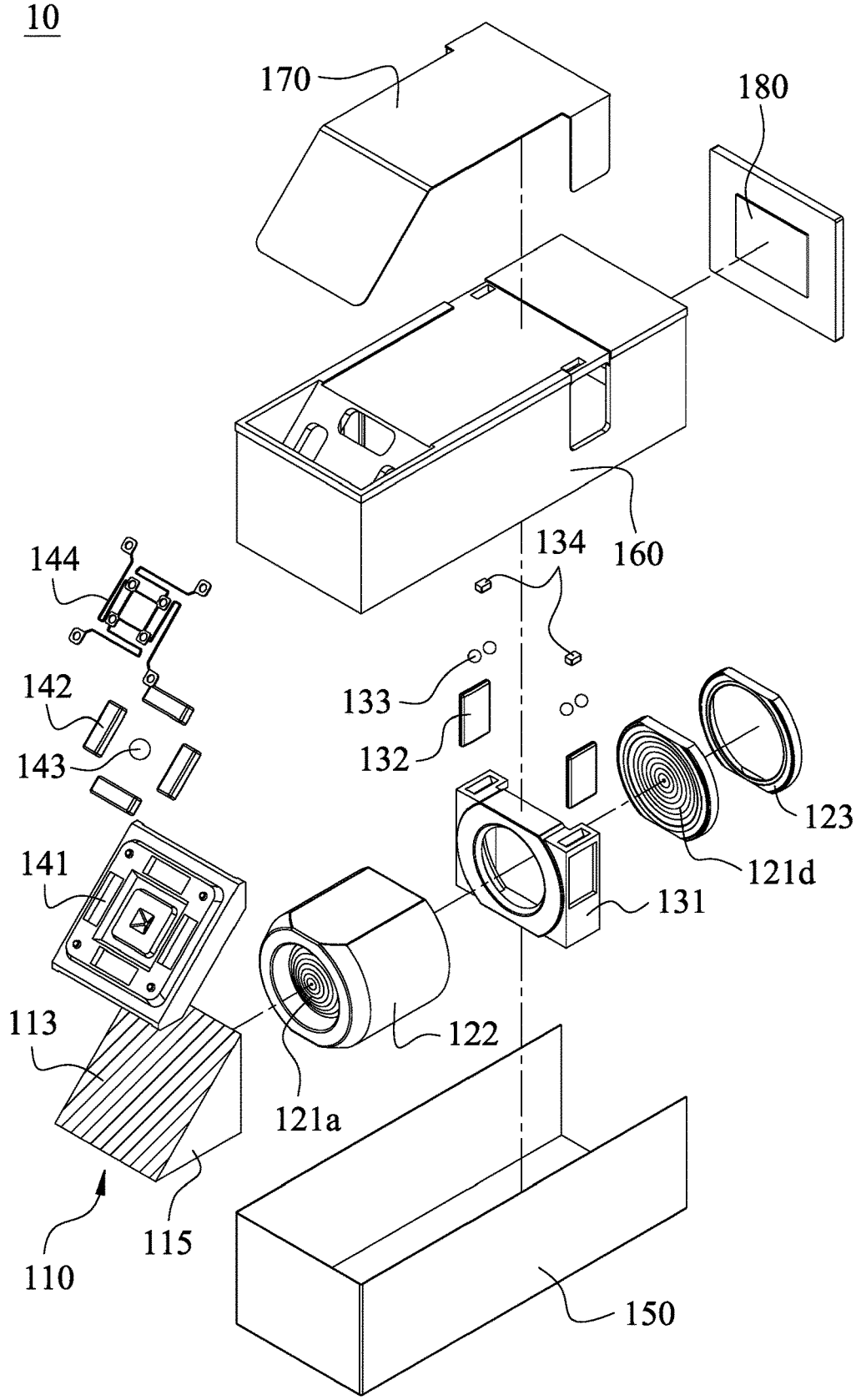
FIG. 1C is another exploded view of the electronic device according to the 1st example in FIG. 1A.
Figure 1D:
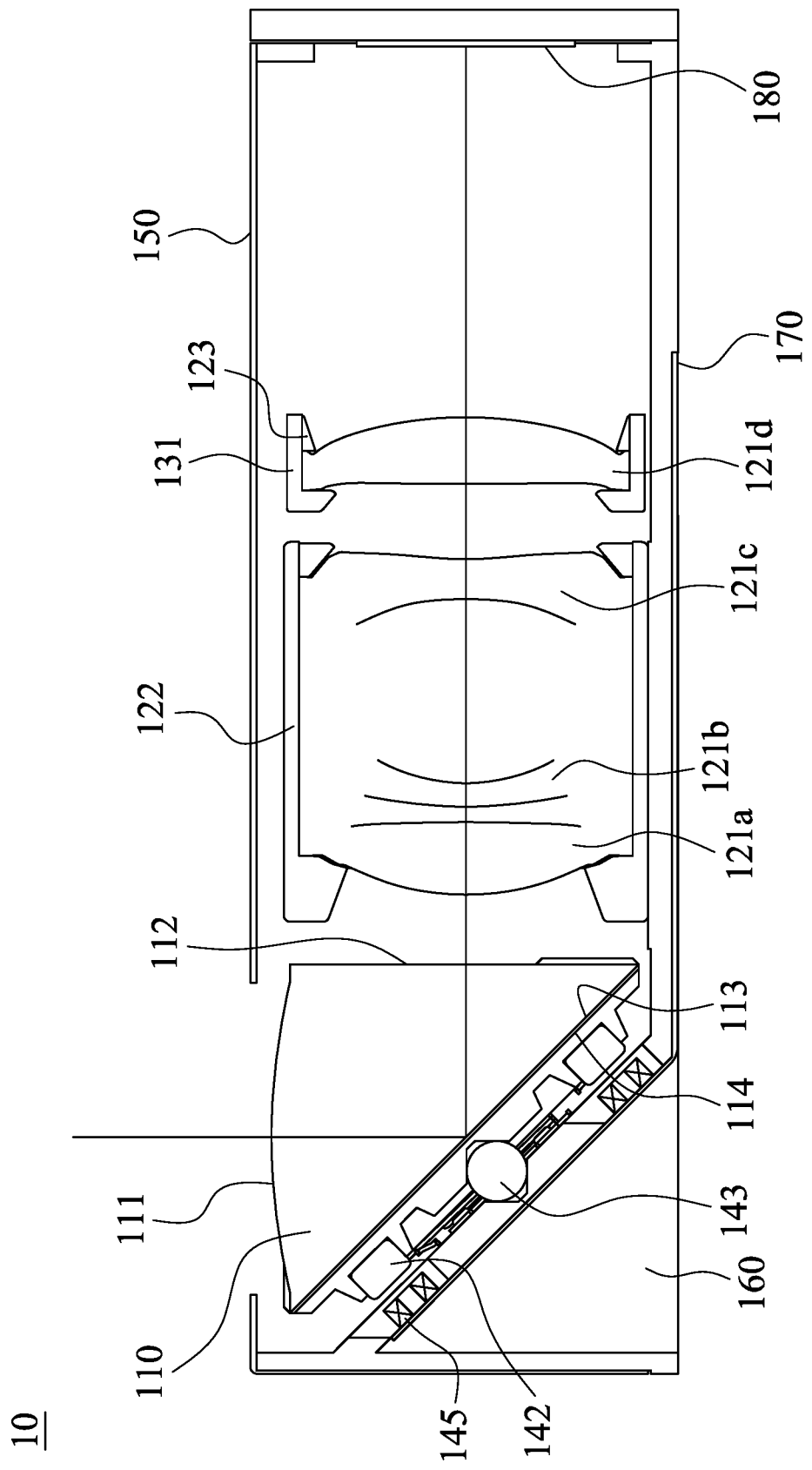
FIG. 1D is a schematic view of the electronic device according to the 1st example in FIG. 1A.

FIG. 1A is a three dimensional view of an electronic device 10 according to the 1st example of the present disclosure. FIG. 1B is an exploded view of the electronic device 10 according to the 1st example in FIG. 1A. FIG. 1C is another exploded view of the electronic device 10 according to the 1st example in FIG. 1A. FIG. 1D is a schematic view of the electronic device 10 according to the 1st example in FIG. 1A. In FIGS. 1A to 1D, the electronic device 10 includes an imaging lens assembly module (its reference numeral is omitted) and an image sensor 180, wherein the image sensor 180 is disposed on an image surface (its reference numeral is omitted) of the imaging lens assembly module.

Moreover, the electronic device 10 further includes a cover 150, a first driving apparatus (its reference numeral is omitted), a second driving apparatus (its reference numeral is omitted), a carrier 160 and a flexible circuit board 170, wherein the first driving apparatus includes a first driving member 131, first magnets 132, first rolling members 133, magnetic members 134 and first coils 135, and the second driving apparatus includes a second driving member 141, second magnets 142, a second rolling member 143, an elastic member 144 and second coils 145. In particular, the first driving apparatus and the second driving apparatus are configured to drive the imaging lens assembly module, the imaging lens assembly module is disposed in the carrier 160, the flexible circuit board 170 is disposed on a surface of the carrier 160, and the cover 150 is disposed on another surface of the carrier 160.

The imaging lens assembly module includes a plastic light-folding element 110 and an optical imaging lens assembly (its reference numeral is omitted), wherein the plastic light-folding element 110 is disposed an object side of the optical imaging lens assembly. In particular, the imaging lens assembly module can be applied to the telephoto (that is, the full view is less than 40 degrees) by the disposition of the plastic light-folding element 110. Therefore, the volume of the imaging lens assembly module can be effectively reduced.

In FIG. 1D, the optical imaging lens assembly, in order from the object side to an image side, includes lens elements 121a, 121b, 121c, 121d and a retainer 123, and the lens elements 121a, 121b, 121c are disposed in a lens barrel 122 of the optical imaging lens assembly, and the lens element 121d and the retainer 123 are disposed in the first driving member 131, wherein the optical features such as numbers, structures, surface shapes and so on of the lens elements can be disposed according to different imaging demand, and the optical features are not limited thereto.

Figure 1E:
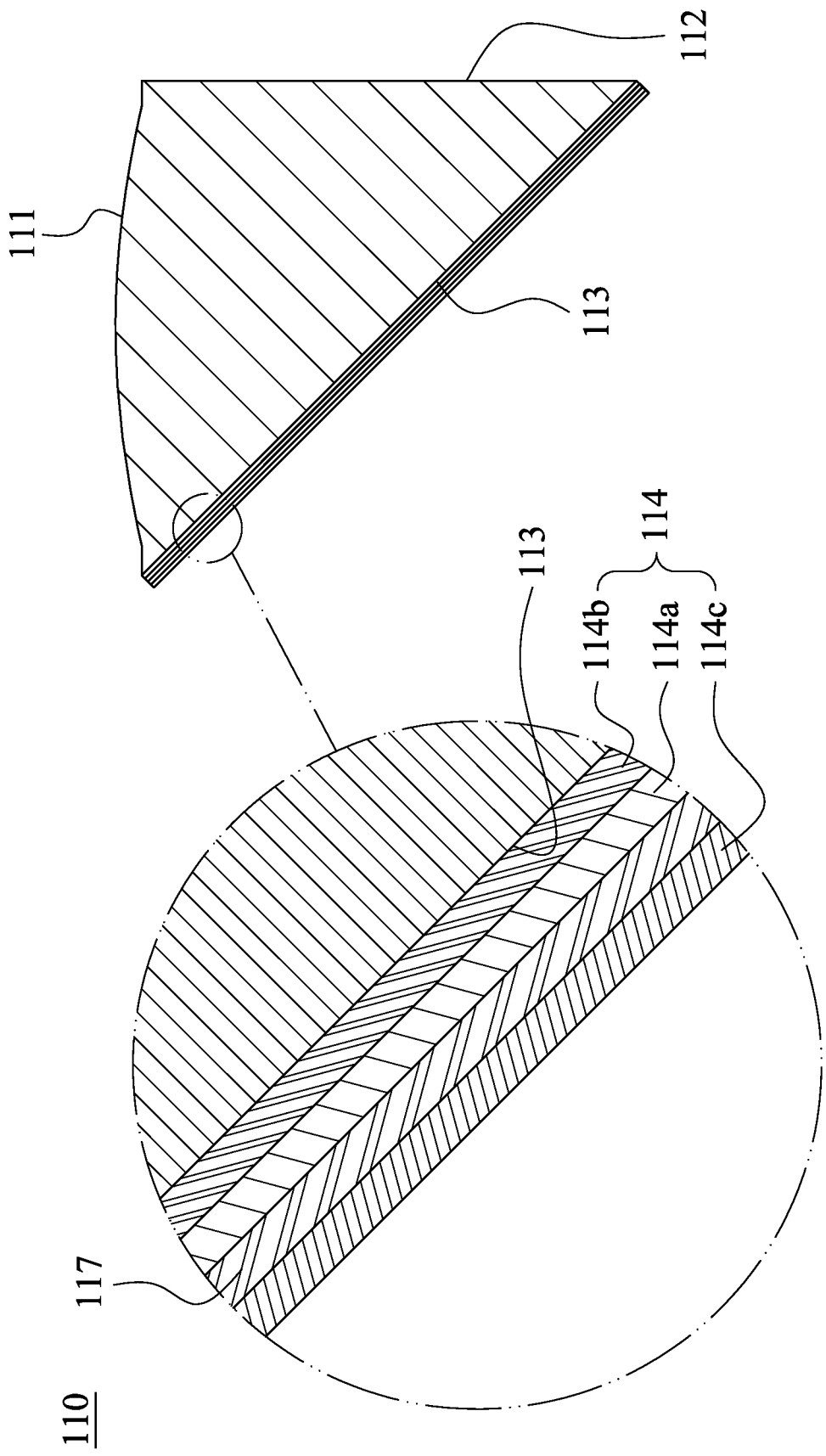
FIG. 1E is a schematic view of the plastic light-folding element according to the 1st example in FIG. 1A.

FIG. 1E is a schematic view of the plastic light-folding element 110 according to the 1st example in FIG. 1A. In FIGS. 1A to 1E, the plastic light-folding element 110 includes an incident surface 111, an exit surface 112, a reflective surface 113 and a reflective optical layer 114. In detail, the incident surface 111 is configured to lead an imaging light (its reference numeral is omitted) enter the plastic light-folding element 110, the exit surface 112 is configured to lead the imaging light exit the plastic light-folding element 110, the reflective surface 113 is configured to fold the imaging light, and the reflective optical layer 114 is disposed on a surface of the reflective surface 113. According to the 1st example, the plastic light-folding element 110 can be a plastic lens element, and the incident surface 111 has an optical curved surface, but the present disclosure is not limited thereto.

The reflective optical layer 114 includes an Ag layer 114a, a bottom layer optical film 114b and a top layer optical film 114c, wherein the Ag layer 114a is configured to lead the imaging light, which enters the incident surface 111, reflect to the exit surface 112; the bottom layer optical film 114b is directly contacted with the Ag layer 114a, and the bottom layer optical film 114b is closer to the reflective surface 113 of the plastic light-folding element 110 than the Ag layer 114a to the reflective surface 113 of the plastic light-folding element 110; a refractive index of the top layer optical film 114c is lower than a refractive index of the bottom layer optical film 114b, wherein the top layer optical film 114c is not directly contacted with the Ag layer 114a, and the top layer optical film 114c is farther from the reflective surface 113 of the plastic light-folding element 110 than the Ag layer 114a from the reflective surface 113 of the plastic light-folding element 110.

In particular, the plastic light-folding element 110 is an optical element disposing the Ag layer 114a on the reflective surface 113 made of the plastic material for folding the imaging light. The physical adhesion between the Ag layer 114a and the reflective surface 113 made of the plastic material is enhanced via the bottom layer optical film 114b, and the higher refractive index can be maintained via the bottom layer optical film 114b so as to reduce the unnecessary reflection inside the plastic light-folding element 110 to increase the image restoration of the imaging light.

In FIGS. 1B and 1E, the plastic light-folding element 110 can further include at least one connecting surface 115, a gate vestige structure 116 and at least one intermediate layer 117. The connecting surface 115 is connected to the incident surface 111, the exit surface 112 and the reflective surface 113. The gate vestige structure 116 is disposed on the connecting surface 115. The intermediate layer 117 is disposed between the top layer optical film 114c and the Ag layer 114a. The injecting efficiency of the injection molding can be enhanced by disposing the gate vestige structure 116 on the connecting surface 115, and the better optical flatness and the better circular symmetry consistency of the incident surface 111, the exit surface 112 and the reflective surface 113 can be obtained by simultaneously forming the incident surface 111, the exit surface 112 and the reflective surface 113. Furthermore, via the intermediate layer 117, the Ag layer 114a can be protected so that the Ag layer 114a is not easily oxidized, and the ability of the resistant to the corrosion of acid and alkali of the Ag layer 114a can be enhanced, but the effect of the intermediate layer 117 is not limited thereto. According to the 1st example, a number of the connecting surface 115 is two, a number of the gate vestige structure 116 is one, and a number of the intermediate layer 117 is two.

It should be mentioned that the drawing number of the intermediate layer 117 is one, but the real number of the intermediate layer 117 can be two or more, and the present disclosure is not limited thereto.

The bottom layer optical film 114b is a metal oxide layer. In particular, the metal oxide layer includes a metal material, the stronger binding force between the metal oxide layer and the Ag layer 114a and the stronger binding force between the metal oxide layer and the plastic material can be simultaneously obtained, and hence the binding force between the bottom layer optical film 114b made of the metal oxide and the metal material is higher than the binding force between the bottom layer optical film made of the non-metal oxide and the metal material. In other words, the better adhesion of the Ag layer 114a to the plastic material can be obtained via the metal oxide layer. It should be mentioned that an ordinary adhesive test is to stick the tape on a surface of the optical layer and then tear off the tape to check the surface condition of the optical layer, and the quality of the adhesion is determined via the surface condition of the optical layer, wherein the serious test condition can be obtained by increasing the numbers of sticking and tearing off the tape, but the present disclosure is not limited thereto. According to the 1st example, the bottom layer optical film 114b is made of $Al_2O_3$, and the top layer optical film 114c is made of $SiO_2$.

Each of the intermediate layers 117 includes a metal layer excluding a silver atom. The surface stability of the Ag layer can be enhanced via the metal layer excluding the silver atom so that the Ag layer is not easily influenced by the external environment, and the combination between the Ag layer and the metal layer excluding the silver atom is better. In particular, the material of the metal layer can be Ti, Cr, Ni and so on, but the present disclosure is not limited thereto.

The bottom layer optical film 114b is directly contacted with the reflective surface 113 of the plastic light-folding element 110. Therefore, the degree of the optical reflection of the Ag layer 114a can be enhanced to maintain the higher optical reflectivity. In particular, the degree of the optical reflection of the silver atom is better than the degree of the optical reflection of the aluminum atom, and the reflecting effect of the Ag layer 114a can be not easily influenced and decreased via the plastic material by disposing the bottom layer optical film 114b.

When the refractive index of the bottom layer optical film 114b is Nb, a thickness of the bottom layer optical film 114b is db, the refractive index of the top layer optical film 114c is Nt, a thickness of the top layer optical film 114c is dt, a refractive index of the Ag layer 114a is NAg, and a thickness of the Ag layer 114a is dAg, the following conditions of the Table 1 are satisfied.

TABLE 1

| 1st example | | | |
|---|---|---|---|
| Nb | 1.6726 | db (nm) | 20 |
| Nt | 1.4618 | dt (nm) | 65 |
| NAg | 0.051 | dAg (nm) | 100 |

It should be mentioned that the refractive index of the air is 1, the refractive index of the plastic light-folding element 110 is 1.64678, and a thickness of each of the intermediate layers 117 is less than the thickness of the Ag layer 114a.

Figure 1F:
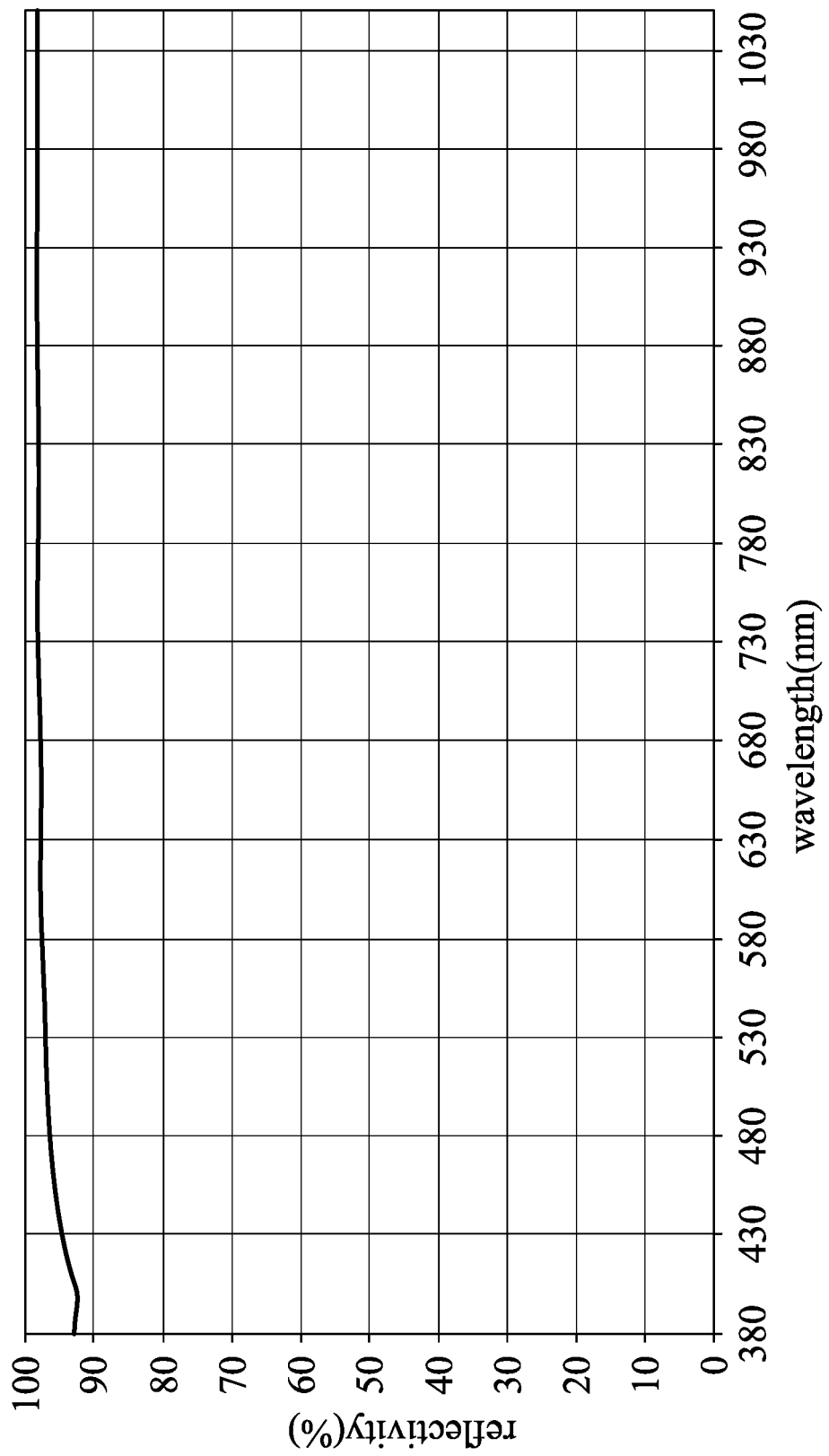
FIG. 1F is a schematic view of a reflectivity result according to the 1st example in FIG. 1A.

FIG. 1F is a schematic view of a reflectivity result according to the 1st example in FIG. 1A. Table 2 is a reflectivity result according to the 1st example.

TABLE 2

| wavelength (nm) | reflectivity (%) |
|---|---|
| 380 | 92.88095 |
| 381 | 92.86194 |
| 382 | 92.84323 |
| 383 | 92.82481 |
| 384 | 92.80669 |
| 385 | 92.78886 |
| 386 | 92.77169 |
| 387 | 92.75479 |
| 388 | 92.73817 |
| 389 | 92.72181 |

TABLE 2-continued

| wavelength (nm) | reflectivity (%) |
|---|---|
| 390 | 92.70572 |
| 391 | 92.6899 |
| 392 | 92.67434 |
| 393 | 92.65904 |
| 394 | 92.64399 |
| 395 | 92.6292 |
| 396 | 92.61466 |
| 397 | 92.60037 |
| 398 | 92.58631 |
| 399 | 92.57251 |
| 400 | 92.55895 |
| 401 | 92.6218 |
| 402 | 92.71196 |
| 403 | 92.79902 |
| 404 | 92.86623 |
| 405 | 92.92973 |
| 406 | 93.01429 |
| 407 | 93.08696 |
| 408 | 93.15476 |
| 409 | 93.22368 |
| 410 | 93.29611 |
| 411 | 93.37138 |
| 412 | 93.43712 |
| 413 | 93.51066 |
| 414 | 93.57662 |
| 415 | 93.64599 |
| 416 | 93.71353 |
| 417 | 93.78017 |
| 418 | 93.84982 |
| 419 | 93.91608 |
| 420 | 93.98196 |
| 421 | 94.05391 |
| 422 | 94.11569 |
| 423 | 94.17811 |
| 424 | 94.24311 |
| 425 | 94.30622 |
| 426 | 94.37049 |
| 427 | 94.43313 |
| 428 | 94.49608 |
| 429 | 94.55893 |
| 430 | 94.61788 |
| 431 | 94.68102 |
| 432 | 94.74079 |
| 433 | 94.79897 |
| 434 | 94.86155 |
| 435 | 94.91983 |
| 436 | 94.97828 |
| 437 | 95.03615 |
| 438 | 95.09356 |
| 439 | 95.15109 |
| 440 | 95.20763 |
| 441 | 95.26249 |
| 442 | 95.32109 |
| 443 | 95.37639 |
| 444 | 95.43024 |
| 445 | 95.48506 |
| 446 | 95.54042 |
| 447 | 95.59198 |
| 448 | 95.64536 |
| 449 | 95.69852 |
| 450 | 95.75127 |
| 451 | 95.77848 |
| 452 | 95.80676 |
| 453 | 95.83338 |
| 454 | 95.86246 |
| 455 | 95.88948 |
| 456 | 95.91631 |
| 457 | 95.94362 |
| 458 | 95.96984 |
| 459 | 95.9968 |
| 460 | 96.02327 |
| 461 | 96.04878 |
| 462 | 96.07622 |
| 463 | 96.10215 |
| 464 | 96.12655 |
| 465 | 96.15248 |
| 466 | 96.17751 |
| 467 | 96.20257 |

TABLE 2-continued

| wavelength (nm) | reflectivity (%) |
|---|---|
| 468 | 96.22835 |
| 469 | 96.25341 |
| 470 | 96.27808 |
| 471 | 96.30277 |
| 472 | 96.32669 |
| 473 | 96.35085 |
| 474 | 96.37608 |
| 475 | 96.3987 |
| 476 | 96.4226 |
| 477 | 96.44644 |
| 478 | 96.46936 |
| 479 | 96.4925 |
| 480 | 96.51593 |
| 481 | 96.53862 |
| 482 | 96.56162 |
| 483 | 96.58405 |
| 484 | 96.60665 |
| 485 | 96.62932 |
| 486 | 96.65138 |
| 487 | 96.67279 |
| 488 | 96.69484 |
| 489 | 96.71672 |
| 490 | 96.73787 |
| 491 | 96.75943 |
| 492 | 96.78084 |
| 493 | 96.80189 |
| 494 | 96.82331 |
| 495 | 96.84414 |
| 496 | 96.86485 |
| 497 | 96.88529 |
| 498 | 96.9058 |
| 499 | 96.92585 |
| 500 | 96.94614 |
| 501 | 96.95403 |
| 502 | 96.96276 |
| 503 | 96.97102 |
| 504 | 96.97887 |
| 505 | 96.987 |
| 506 | 96.99552 |
| 507 | 97.00351 |
| 508 | 97.01161 |
| 509 | 97.01959 |
| 510 | 97.02776 |
| 511 | 97.03577 |
| 512 | 97.0435 |
| 513 | 97.05177 |
| 514 | 97.05945 |
| 515 | 97.06723 |
| 516 | 97.07502 |
| 517 | 97.08307 |
| 518 | 97.09087 |
| 519 | 97.09856 |
| 520 | 97.10637 |
| 521 | 97.11406 |
| 522 | 97.12172 |
| 523 | 97.12935 |
| 524 | 97.13686 |
| 525 | 97.14451 |
| 526 | 97.15197 |
| 527 | 97.15956 |
| 528 | 97.16702 |
| 529 | 97.1744 |
| 530 | 97.18201 |
| 531 | 97.18959 |
| 532 | 97.19693 |
| 533 | 97.20424 |
| 534 | 97.21165 |
| 535 | 97.21893 |
| 536 | 97.22616 |
| 537 | 97.23347 |
| 538 | 97.24069 |
| 539 | 97.24789 |
| 540 | 97.25507 |
| 541 | 97.26222 |
| 542 | 97.26933 |
| 543 | 97.27646 |
| 544 | 97.28353 |
| 545 | 97.29051 |

TABLE 2-continued

| wavelength (nm) | reflectivity (%) |
|---|---|
| 546 | 97.29762 |
| 547 | 97.30452 |
| 548 | 97.31151 |
| 549 | 97.3185 |
| 550 | 97.32532 |
| 551 | 97.3317 |
| 552 | 97.33801 |
| 553 | 97.34424 |
| 554 | 97.35054 |
| 555 | 97.35677 |
| 556 | 97.36297 |
| 557 | 97.3692 |
| 558 | 97.37532 |
| 559 | 97.3815 |
| 560 | 97.38758 |
| 561 | 97.39369 |
| 562 | 97.39979 |
| 563 | 97.40586 |
| 564 | 97.41191 |
| 565 | 97.41795 |
| 566 | 97.42395 |
| 567 | 97.42994 |
| 568 | 97.43589 |
| 569 | 97.44183 |
| 570 | 97.44776 |
| 571 | 97.45365 |
| 572 | 97.45954 |
| 573 | 97.4654 |
| 574 | 97.47123 |
| 575 | 97.47704 |
| 576 | 97.48284 |
| 577 | 97.48861 |
| 578 | 97.49437 |
| 579 | 97.50011 |
| 580 | 97.50582 |
| 581 | 97.51151 |
| 582 | 97.51718 |
| 583 | 97.52284 |
| 584 | 97.52848 |
| 585 | 97.53409 |
| 586 | 97.53969 |
| 587 | 97.54527 |
| 588 | 97.55082 |
| 589 | 97.55638 |
| 590 | 97.56187 |
| 591 | 97.56738 |
| 592 | 97.57285 |
| 593 | 97.57832 |
| 594 | 97.58374 |
| 595 | 97.58918 |
| 596 | 97.59457 |
| 597 | 97.59995 |
| 598 | 97.60531 |
| 599 | 97.61067 |
| 600 | 97.61598 |
| 601 | 97.61791 |
| 602 | 97.61987 |
| 603 | 97.62181 |
| 604 | 97.62378 |
| 605 | 97.62574 |
| 606 | 97.62776 |
| 607 | 97.62964 |
| 608 | 97.63166 |
| 609 | 97.63365 |
| 610 | 97.63568 |
| 611 | 97.6377 |
| 612 | 97.63972 |
| 613 | 97.64172 |
| 614 | 97.64372 |
| 615 | 97.64581 |
| 616 | 97.64788 |
| 617 | 97.64988 |
| 618 | 97.65198 |
| 619 | 97.65404 |
| 620 | 97.65608 |
| 621 | 97.6582 |
| 622 | 97.66026 |
| 623 | 97.66242 |

TABLE 2-continued

| wavelength (nm) | reflectivity (%) |
|---|---|
| 624 | 97.66447 |
| 625 | 97.6665 |
| 626 | 97.66864 |
| 627 | 97.67075 |
| 628 | 97.67282 |
| 629 | 97.67486 |
| 630 | 97.67703 |
| 631 | 97.67912 |
| 632 | 97.68129 |
| 633 | 97.68341 |
| 634 | 97.68553 |
| 635 | 97.68773 |
| 636 | 97.6898 |
| 637 | 97.69189 |
| 638 | 97.69413 |
| 639 | 97.69624 |
| 640 | 97.69838 |
| 641 | 97.70052 |
| 642 | 97.70271 |
| 643 | 97.70492 |
| 644 | 97.70698 |
| 645 | 97.70915 |
| 646 | 97.71131 |
| 647 | 97.71355 |
| 648 | 97.71569 |
| 649 | 97.71783 |
| 650 | 97.7201 |
| 651 | 97.7248 |
| 652 | 97.72953 |
| 653 | 97.73418 |
| 654 | 97.73895 |
| 655 | 97.74347 |
| 656 | 97.74824 |
| 657 | 97.75285 |
| 658 | 97.75745 |
| 659 | 97.76207 |
| 660 | 97.76665 |
| 661 | 97.77129 |
| 662 | 97.77568 |
| 663 | 97.78039 |
| 664 | 97.78488 |
| 665 | 97.78938 |
| 666 | 97.79385 |
| 667 | 97.79835 |
| 668 | 97.80278 |
| 669 | 97.80724 |
| 670 | 97.81164 |
| 671 | 97.81608 |
| 672 | 97.82047 |
| 673 | 97.82499 |
| 674 | 97.82919 |
| 675 | 97.83356 |
| 676 | 97.83794 |
| 677 | 97.84223 |
| 678 | 97.84665 |
| 679 | 97.8509 |
| 680 | 97.85517 |
| 681 | 97.85935 |
| 682 | 97.86372 |
| 683 | 97.86791 |
| 684 | 97.87209 |
| 685 | 97.87644 |
| 686 | 97.88042 |
| 687 | 97.88473 |
| 688 | 97.88885 |
| 689 | 97.89285 |
| 690 | 97.89718 |
| 691 | 97.90112 |
| 692 | 97.90534 |
| 693 | 97.90941 |
| 694 | 97.91344 |
| 695 | 97.91744 |
| 696 | 97.92157 |
| 697 | 97.92559 |
| 698 | 97.92974 |
| 699 | 97.93355 |
| 700 | 97.9375 |
| 701 | 97.94164 |
| 702 | 97.94578 |
| 703 | 97.94993 |
| 704 | 97.95395 |
| 705 | 97.95823 |
| 706 | 97.96229 |
| 707 | 97.96615 |
| 708 | 97.97025 |
| 709 | 97.97426 |
| 710 | 97.97814 |
| 711 | 97.98222 |
| 712 | 97.98633 |
| 713 | 97.99027 |
| 714 | 97.99426 |
| 715 | 97.99808 |
| 716 | 98.00194 |
| 717 | 98.00593 |
| 718 | 98.00982 |
| 719 | 98.01382 |
| 720 | 98.01767 |
| 721 | 98.02146 |
| 722 | 98.0254 |
| 723 | 98.02911 |
| 724 | 98.03285 |
| 725 | 98.03685 |
| 726 | 98.04048 |
| 727 | 98.04435 |
| 728 | 98.04789 |
| 729 | 98.05155 |
| 730 | 98.05551 |
| 731 | 98.05912 |
| 732 | 98.0628 |
| 733 | 98.06649 |
| 734 | 98.07038 |
| 735 | 98.07401 |
| 736 | 98.07774 |
| 737 | 98.08132 |
| 738 | 98.0849 |
| 739 | 98.08864 |
| 740 | 98.09204 |
| 741 | 98.09587 |
| 742 | 98.09918 |
| 743 | 98.10295 |
| 744 | 98.10648 |
| 745 | 98.10989 |
| 746 | 98.11354 |
| 747 | 98.11677 |
| 748 | 98.12041 |
| 749 | 98.12405 |
| 750 | 98.12733 |
| 751 | 98.1283 |
| 752 | 98.12883 |
| 753 | 98.12947 |
| 754 | 98.13053 |
| 755 | 98.13129 |
| 756 | 98.13211 |
| 757 | 98.13278 |
| 758 | 98.13417 |
| 759 | 98.13471 |
| 760 | 98.13531 |
| 761 | 98.13634 |
| 762 | 98.13677 |
| 763 | 98.13797 |
| 764 | 98.13857 |
| 765 | 98.13929 |
| 766 | 98.14027 |
| 767 | 98.14106 |
| 768 | 98.14193 |
| 769 | 98.14279 |
| 770 | 98.14357 |
| 771 | 98.14444 |
| 772 | 98.14547 |
| 773 | 98.14606 |
| 774 | 98.14698 |
| 775 | 98.14778 |
| 776 | 98.14869 |
| 777 | 98.14976 |
| 778 | 98.15024 |
| 779 | 98.15114 |

TABLE 2-continued

| wavelength (nm) | reflectivity (%) |
|---|---|
| 780 | 98.15214 |
| 781 | 98.15301 |
| 782 | 98.15388 |
| 783 | 98.15475 |
| 784 | 98.15563 |
| 785 | 98.15651 |
| 786 | 98.15739 |
| 787 | 98.15827 |
| 788 | 98.15916 |
| 789 | 98.16005 |
| 790 | 98.16094 |
| 791 | 98.16184 |
| 792 | 98.16273 |
| 793 | 98.16363 |
| 794 | 98.16454 |
| 795 | 98.16544 |
| 796 | 98.16635 |
| 797 | 98.16726 |
| 798 | 98.16817 |
| 799 | 98.16908 |
| 800 | 98.17 |
| 801 | 98.17092 |
| 802 | 98.17184 |
| 803 | 98.17276 |
| 804 | 98.17369 |
| 805 | 98.17461 |
| 806 | 98.17554 |
| 807 | 98.17647 |
| 808 | 98.17741 |
| 809 | 98.17834 |
| 810 | 98.17928 |
| 811 | 98.18022 |
| 812 | 98.18116 |
| 813 | 98.18211 |
| 814 | 98.18305 |
| 815 | 98.184 |
| 816 | 98.18495 |
| 817 | 98.18589 |
| 818 | 98.18684 |
| 819 | 98.1878 |
| 820 | 98.18875 |
| 821 | 98.1897 |
| 822 | 98.19066 |
| 823 | 98.19162 |
| 824 | 98.19258 |
| 825 | 98.19354 |
| 826 | 98.19451 |
| 827 | 98.19547 |
| 828 | 98.19644 |
| 829 | 98.1974 |
| 830 | 98.19837 |
| 831 | 98.19935 |
| 832 | 98.20032 |
| 833 | 98.20129 |
| 834 | 98.20227 |
| 835 | 98.20324 |
| 836 | 98.20422 |
| 837 | 98.2052 |
| 838 | 98.20618 |
| 839 | 98.20716 |
| 840 | 98.20815 |
| 841 | 98.20913 |
| 842 | 98.21012 |
| 843 | 98.21111 |
| 844 | 98.21209 |
| 845 | 98.21308 |
| 846 | 98.21408 |
| 847 | 98.21507 |
| 848 | 98.21606 |
| 849 | 98.21706 |
| 850 | 98.21805 |
| 851 | 98.22043 |
| 852 | 98.22281 |
| 853 | 98.22518 |
| 854 | 98.22754 |
| 855 | 98.2299 |
| 856 | 98.23225 |
| 857 | 98.2346 |
| 858 | 98.23694 |
| 859 | 98.23927 |
| 860 | 98.2416 |
| 861 | 98.24393 |
| 862 | 98.24624 |
| 863 | 98.24855 |
| 864 | 98.25085 |
| 865 | 98.25315 |
| 866 | 98.25545 |
| 867 | 98.25773 |
| 868 | 98.26001 |
| 869 | 98.26229 |
| 870 | 98.26456 |
| 871 | 98.26683 |
| 872 | 98.26908 |
| 873 | 98.27134 |
| 874 | 98.27359 |
| 875 | 98.27583 |
| 876 | 98.27807 |
| 877 | 98.2803 |
| 878 | 98.28252 |
| 879 | 98.28474 |
| 880 | 98.28696 |
| 881 | 98.28917 |
| 882 | 98.29137 |
| 883 | 98.29357 |
| 884 | 98.29577 |
| 885 | 98.29796 |
| 886 | 98.30014 |
| 887 | 98.30232 |
| 888 | 98.30449 |
| 889 | 98.30666 |
| 890 | 98.30882 |
| 891 | 98.31098 |
| 892 | 98.31313 |
| 893 | 98.31527 |
| 894 | 98.31742 |
| 895 | 98.31955 |
| 896 | 98.32168 |
| 897 | 98.32381 |
| 898 | 98.32593 |
| 899 | 98.32805 |
| 900 | 98.33016 |
| 901 | 98.33195 |
| 902 | 98.33374 |
| 903 | 98.33552 |
| 904 | 98.3373 |
| 905 | 98.33908 |
| 906 | 98.34085 |
| 907 | 98.34262 |
| 908 | 98.34438 |
| 909 | 98.34614 |
| 910 | 98.3479 |
| 911 | 98.34965 |
| 912 | 98.35141 |
| 913 | 98.35315 |
| 914 | 98.3549 |
| 915 | 98.35664 |
| 916 | 98.35837 |
| 917 | 98.36011 |
| 918 | 98.36184 |
| 919 | 98.36356 |
| 920 | 98.36529 |
| 921 | 98.36701 |
| 922 | 98.36872 |
| 923 | 98.37043 |
| 924 | 98.37214 |
| 925 | 98.37385 |
| 926 | 98.37555 |
| 927 | 98.37725 |
| 928 | 98.37894 |
| 929 | 98.38063 |
| 930 | 98.38232 |
| 931 | 98.38401 |
| 932 | 98.38569 |
| 933 | 98.38737 |
| 934 | 98.38904 |
| 935 | 98.39071 |

TABLE 2-continued

| wavelength (nm) | reflectivity (%) |
|---|---|
| 936 | 98.39238 |
| 937 | 98.39405 |
| 938 | 98.39571 |
| 939 | 98.39737 |
| 940 | 98.39902 |
| 941 | 98.40067 |
| 942 | 98.40232 |
| 943 | 98.40396 |
| 944 | 98.40561 |
| 945 | 98.40724 |
| 946 | 98.40888 |
| 947 | 98.41051 |
| 948 | 98.41214 |
| 949 | 98.41376 |
| 950 | 98.41539 |
| 951 | 98.41241 |
| 952 | 98.40944 |
| 953 | 98.40648 |
| 954 | 98.40354 |
| 955 | 98.4006 |
| 956 | 98.39768 |
| 957 | 98.39477 |
| 958 | 98.39187 |
| 959 | 98.38898 |
| 960 | 98.3861 |
| 961 | 98.38323 |
| 962 | 98.38037 |
| 963 | 98.37752 |
| 964 | 98.37469 |
| 965 | 98.37186 |
| 966 | 98.36904 |
| 967 | 98.36624 |
| 968 | 98.36345 |
| 969 | 98.36066 |
| 970 | 98.35789 |
| 971 | 98.35513 |
| 972 | 98.35238 |
| 973 | 98.34964 |
| 974 | 98.34691 |
| 975 | 98.34419 |
| 976 | 98.34148 |
| 977 | 98.33879 |
| 978 | 98.3361 |
| 979 | 98.33342 |
| 980 | 98.33075 |
| 981 | 98.32809 |
| 982 | 98.32545 |
| 983 | 98.32281 |
| 984 | 98.32018 |
| 985 | 98.31756 |
| 986 | 98.31495 |
| 987 | 98.31235 |
| 988 | 98.30977 |
| 989 | 98.30719 |
| 990 | 98.30462 |
| 991 | 98.30206 |
| 992 | 98.29951 |
| 993 | 98.29697 |
| 994 | 98.29444 |
| 995 | 98.29192 |
| 996 | 98.28941 |
| 997 | 98.28691 |
| 998 | 98.28442 |
| 999 | 98.28193 |
| 1000 | 98.27946 |
| 1001 | 98.27847 |
| 1002 | 98.27748 |
| 1003 | 98.2765 |
| 1004 | 98.27554 |
| 1005 | 98.27457 |
| 1006 | 98.27362 |
| 1007 | 98.27268 |
| 1008 | 98.27174 |
| 1009 | 98.27081 |
| 1010 | 98.26989 |
| 1011 | 98.26897 |
| 1012 | 98.26807 |
| 1013 | 98.26717 |
| 1014 | 98.26628 |
| 1015 | 98.2654 |
| 1016 | 98.26452 |
| 1017 | 98.26366 |
| 1018 | 98.2628 |
| 1019 | 98.26194 |
| 1020 | 98.2611 |
| 1021 | 98.26026 |
| 1022 | 98.25943 |
| 1023 | 98.25861 |
| 1024 | 98.2578 |
| 1025 | 98.25699 |
| 1026 | 98.25619 |
| 1027 | 98.25539 |
| 1028 | 98.25461 |
| 1029 | 98.25383 |
| 1030 | 98.25306 |
| 1031 | 98.25229 |
| 1032 | 98.25154 |
| 1033 | 98.25078 |
| 1034 | 98.25004 |
| 1035 | 98.2493 |
| 1036 | 98.24857 |
| 1037 | 98.24785 |
| 1038 | 98.24713 |
| 1039 | 98.24642 |
| 1040 | 98.24572 |
| 1041 | 98.24502 |
| 1042 | 98.24433 |
| 1043 | 98.24365 |
| 1044 | 98.24297 |
| 1045 | 98.2423 |
| 1046 | 98.24164 |
| 1047 | 98.24098 |
| 1048 | 98.24033 |
| 1049 | 98.23969 |
| 1050 | 98.23905 |

2nd Example

Figure 2:
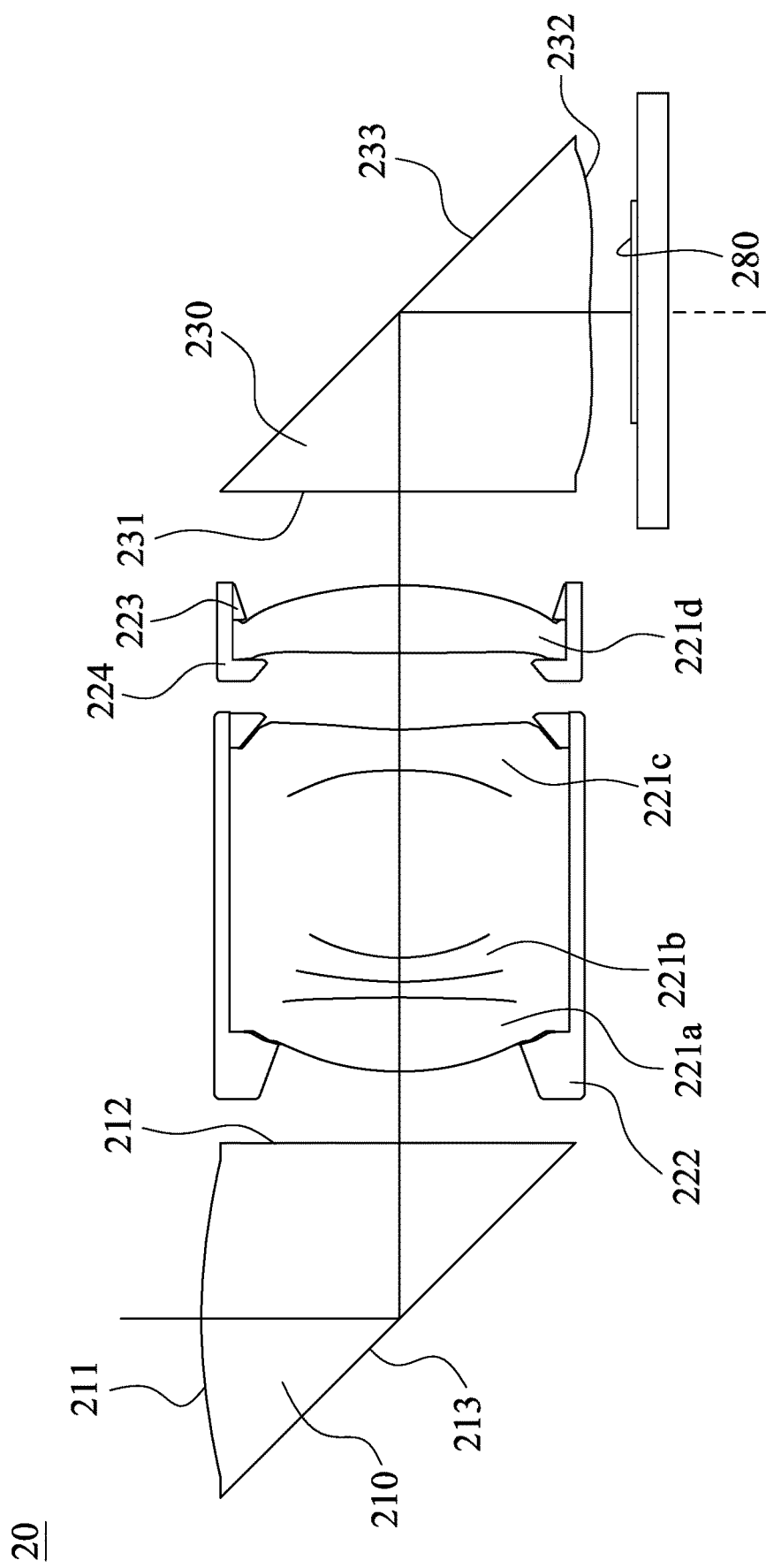
FIG. 2 is a schematic view of an electronic device according to the 2nd example of the present disclosure.

FIG. 2 is a schematic view of an electronic device 20 according to the 2nd example of the present disclosure. In FIG. 2, the electronic device 20 includes an imaging lens assembly module (its reference numeral is omitted) and an image sensor 280, wherein the image sensor 280 is disposed on an image surface (its reference numeral is omitted) of the imaging lens assembly module.

The imaging lens assembly module includes plastic light-folding elements 210, 230 and an optical imaging lens assembly (its reference numeral is omitted), wherein the plastic light-folding element 210 is disposed on an object side of the optical imaging lens assembly, and the plastic light-folding element 230 is disposed on an image side of the optical imaging lens assembly. In particular, the imaging lens assembly module can be applied to the telephoto (that is, the full view is less than 40 degrees) by the disposition of the plastic light-folding elements 210, 230. Therefore, the volume of the imaging lens assembly module can be effectively reduced.

The optical imaging lens assembly, in order from the object side to the image side, includes lens elements 221a, 221b, 221c, 221d and a retainer 223, and the lens elements 221a, 221b, 221c are disposed in a lens barrel 222 of the optical imaging lens assembly, and the lens element 221d and the retainer 223 are disposed in a driving member 224 of the optical imaging lens assembly, wherein the optical features such as numbers, structures, surface shapes and so on of the lens elements can be disposed according to different imaging demand, and the optical features are not limited thereto.

The plastic light-folding element 210 includes an incident surface 211, an exit surface 212, a reflective surface 213 and a reflective optical layer (its reference numeral is omitted), and the plastic light-folding element 230 includes an incident surface 231, an exit surface 232, a reflective surface 233 and a reflective optical layer (its reference numeral is omitted). In detail, the incident surfaces 211, 231 are configured to lead an imaging light (its reference numeral is omitted) enter the plastic light-folding elements 210, 230, respectively. The exit surfaces 212, 232 are configured to lead the imaging light exit the plastic light-folding elements 210, 230, respectively. The reflective surfaces 213, 233 are configured to fold the imaging light. The reflective optical layers are disposed on surfaces of the reflective surfaces 213, 233, respectively. According to the 2nd example, the plastic light-folding element 210 can be a plastic lens element, and each of the incident surface 211 and the exit surface 232 has an optical curved surface, but the present disclosure is not limited thereto.

Further, all of other structures and dispositions according to the 2nd example are the same as the structures and the dispositions according to the 1st example, and will not be described again herein.

3rd Example

Figure 3A:
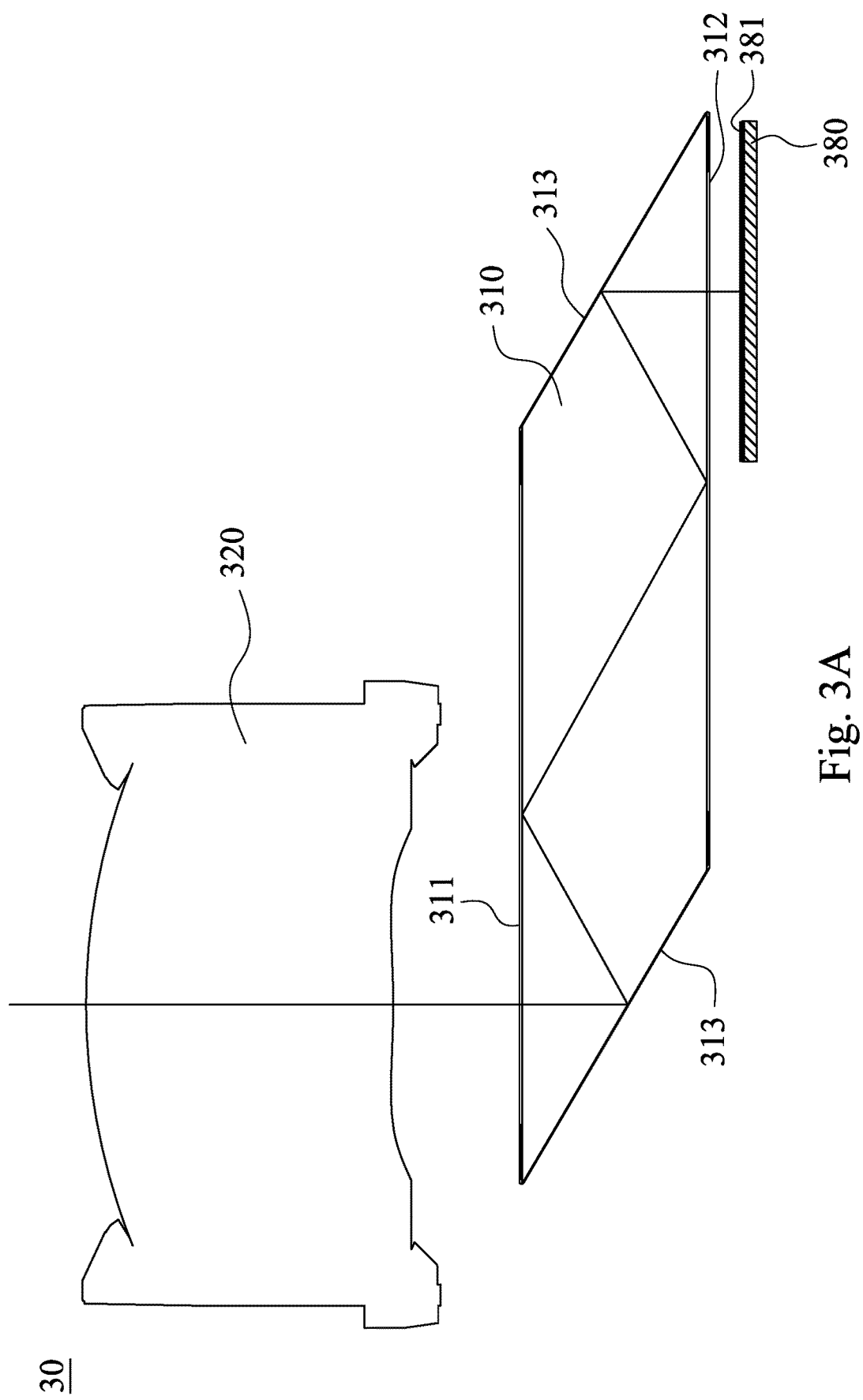
FIG. 3A is a schematic view of an electronic device according to the 3rd example of the present disclosure.

FIG. 3A is a schematic view of an electronic device 30 according to the 3rd example of the present disclosure. In FIG. 3A, the electronic device 30 includes an imaging lens assembly module (its reference numeral is omitted) and an image sensor 380, wherein the image sensor 380 is disposed on an image surface 381 of the imaging lens assembly module.

The imaging lens assembly module includes a plastic light-folding element 310 and an optical imaging lens assembly 320, wherein the plastic light-folding element 310 is disposed an image side of the optical imaging lens assembly 320. In particular, the imaging lens assembly module can be applied to the telephoto (that is, the full view is less than 40 degrees). Therefore, the volume of the imaging lens assembly module can be effectively reduced.

Figure 3B:
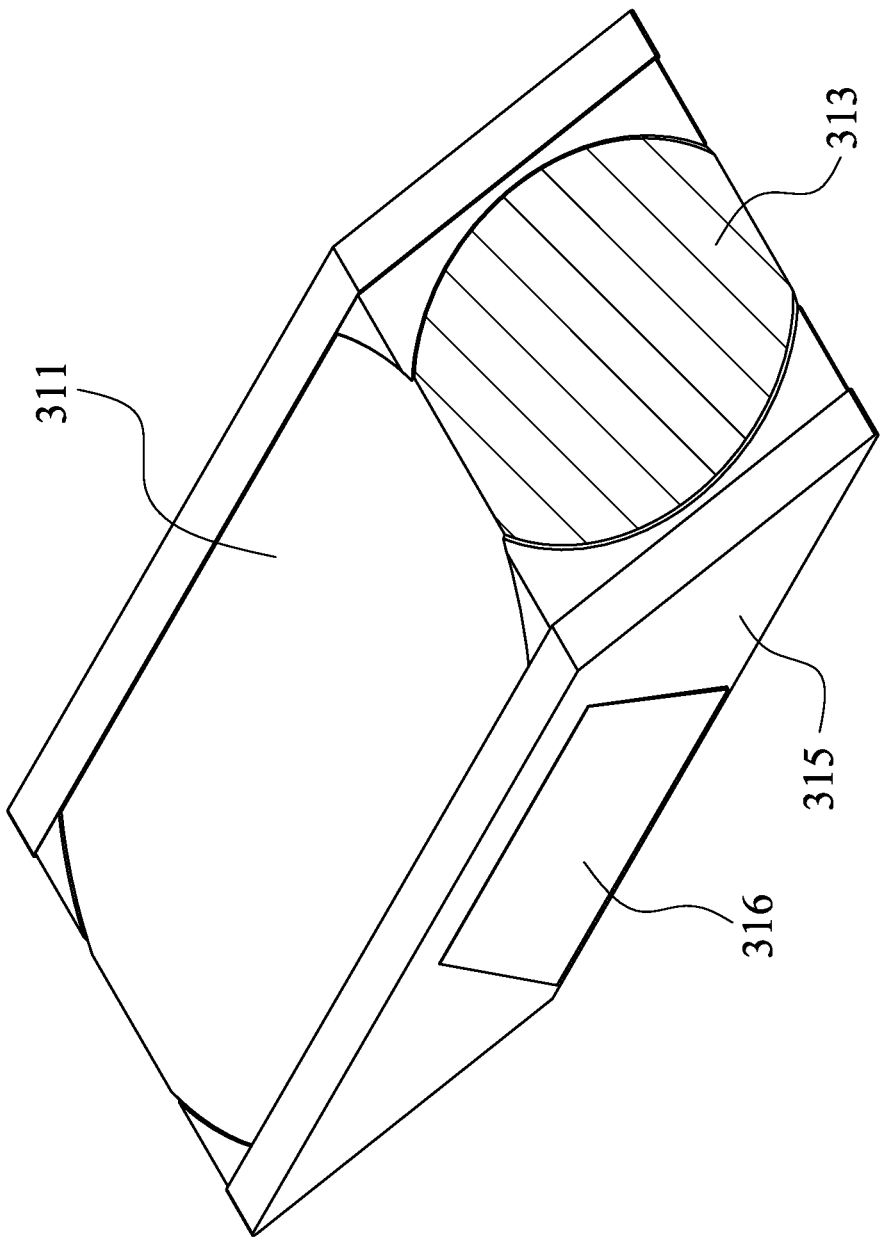
FIG. 3B is a three dimensional view of the plastic light-folding element according to the 3rd example in FIG. 3A.
Figure 3C:
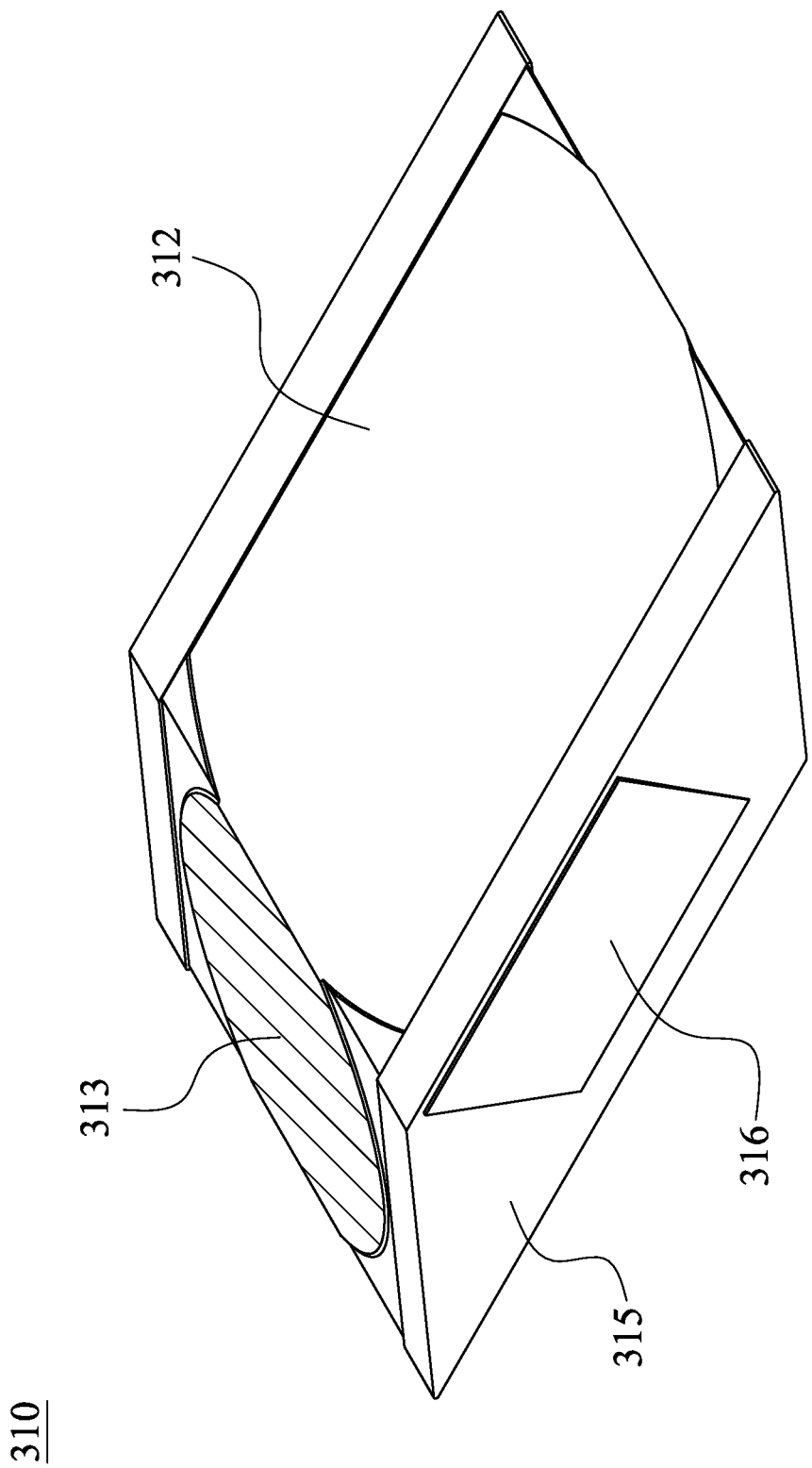
FIG. 3C is another three dimensional view of the plastic light-folding element according to the 3rd example in FIG. 3A.
Figure 3D:
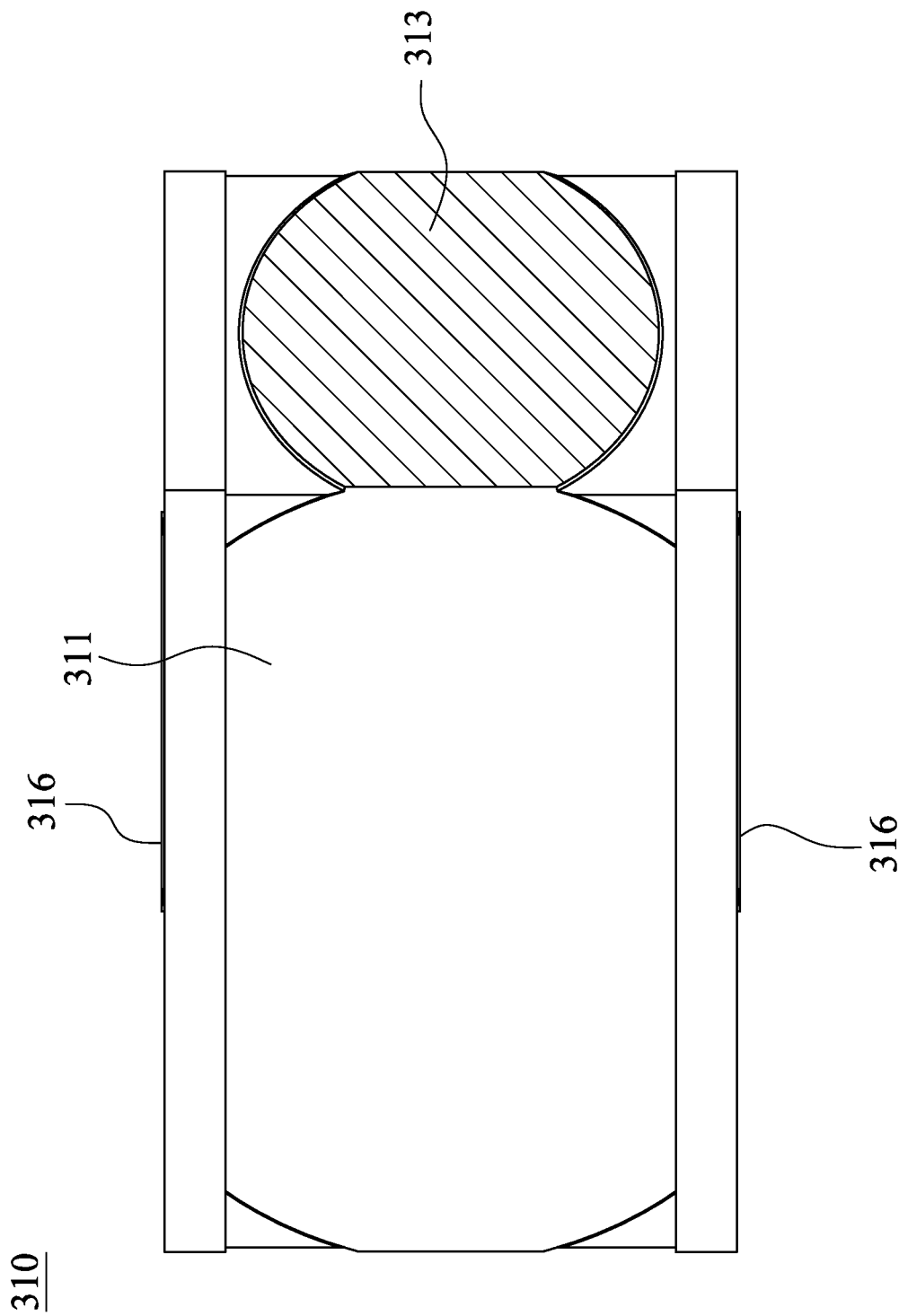
FIG. 3D is a schematic view of an incident surface and a reflective surface of the plastic light-folding element according to the 3rd example in FIG. 3A.

FIG. 3B is a three dimensional view of the plastic light-folding element 310 according to the 3rd example in FIG. 3A. FIG. 3C is another three dimensional view of the plastic light-folding element 310 according to the 3rd example in FIG. 3A. FIG. 3D is a schematic view of an incident surface 311 and a reflective surface 313 of the plastic light-folding element 310 according to the 3rd example in FIG. 3A. In FIGS. 3A to 3D, the plastic light-folding element 310 includes the incident surface 311, an exit surface 312, the reflective surface 313, a reflective optical layer (its reference numeral is omitted), at least one connecting surface 315, at least one gate vestige structure 316 and at least one intermediate layer (its reference numeral is omitted). In detail, the incident surface 311 is configured to lead an imaging light (its reference numeral is omitted) enter the plastic light-folding element 310, the exit surface 312 is configured to lead the imaging light exit the plastic light-folding element 310, the reflective surface 313 is configured to fold the imaging light, and the reflective optical layer is disposed on a surface of the reflective surface 313, the connecting surface 315 is connected to the incident surface 311, the exit surface 312 and the reflective surface 313, and the gate vestige structure 316 is disposed on the connecting surface 315. According to the 3rd example, a number of the reflective surface 313 is four, a number of the connecting surface 315 is two, a number of the gate vestige structure 316 is two, a number of the intermediate layer is two, one of the reflective surfaces 313 and the incident surface 311 are coplanar, and another one of the reflective surfaces 313 and the exit surface 312 are coplanar, wherein the real number of the intermediate layer can be two or more, but the present disclosure is not limited thereto.

The reflective optical layer includes an Ag layer (its reference numeral is omitted), a bottom layer optical film (its reference numeral is omitted) and a top layer optical film (its reference numeral is omitted), wherein the Ag layer is configured to lead the imaging light, which enters the incident surface 311, reflect to the exit surface 312; the bottom layer optical film is directly contacted with the Ag layer, and the bottom layer optical film is closer to each of the reflective surfaces 313 of the plastic light-folding element 310 than the Ag layer to each of the reflective surfaces 313 of the plastic light-folding element 310; a refractive index of the top layer optical film is lower than a refractive index of the bottom layer optical film, wherein the top layer optical film is not directly contacted with the Ag layer, and the top layer optical film is farther from each of the reflective surfaces 313 of the plastic light-folding element 310 than the Ag layer from each of the reflective surfaces 313 of the plastic light-folding element 310.

According to the 3rd example, the bottom layer optical film is made of $Al_2O_3$, and the top layer optical film is made of $SiO_2$.

Furthermore, each of the incident surface 311, the exit surface 312 and the reflective surfaces 313 includes an optical portion (its reference numeral is omitted) and an arc step structure (its reference numeral is omitted), wherein the arc step structure is disposed on a periphery of the optical portion, and an arc is formed by the arc step structure centered on the optical portion.

When the refractive index of the bottom layer optical film is Nb, a thickness of the bottom layer optical film is db, the refractive index of the top layer optical film is Nt, a thickness of the top layer optical film is dt, a refractive index of the Ag layer is NAg, and a thickness of the Ag layer is dAg, the following conditions of the Table 3 are satisfied.

TABLE 3

| 3rd example | | | |
|---|---|---|---|
| Nb | 1.6726 | db (nm) | 20 |
| Nt | 1.4618 | dt (nm) | 65 |
| NAg | 0.051 | dAg (nm) | 100 |

It should be mentioned that the refractive index of the air is 1, the refractive index of the plastic light-folding element 310 is 1.64678, and a thickness of each of the intermediate layers is less than the thickness of the Ag layer.

Further, all of other structures and dispositions according to the 3rd example are the same as the structures and the dispositions according to the 1st example, and will not be described again herein.

4th Example

Figure 4A:
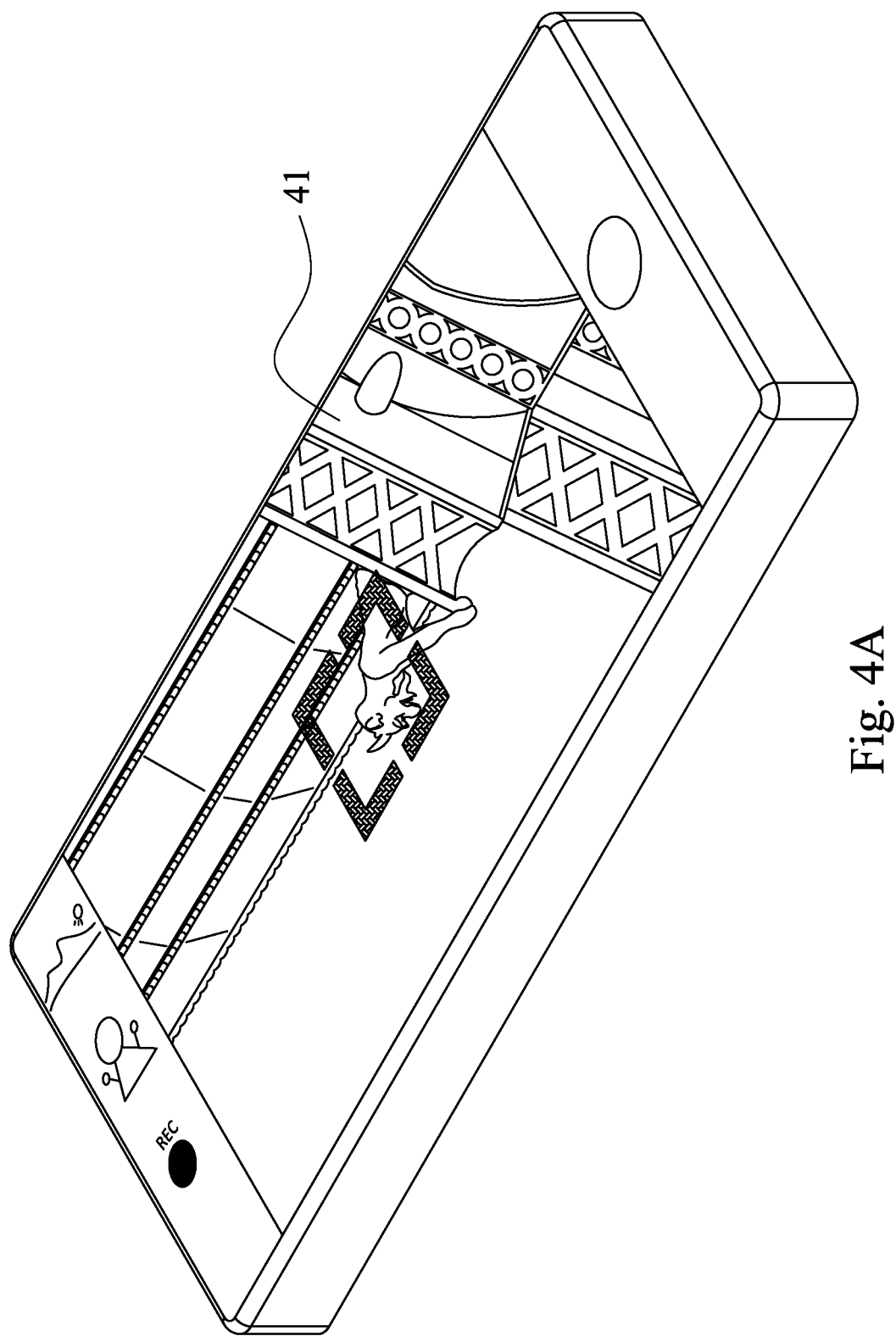
FIG. 4A is a schematic view of an electronic device according to the 4th example of the present disclosure.

FIG. 4A is a schematic view of an electronic device 40 according to the 4th example of the present disclosure. FIG. 4B is another schematic view of the electronic device 40 according to the 4th example in FIG. 4A. In FIGS. 4A and 4B, the electronic device 40 according to the 4th example is a smart phone, and includes an imaging lens assembly module (its reference numeral is omitted), an image sensor (not shown) and a user interface 41, wherein the image sensor is disposed on an image surface (not shown) of the imaging lens assembly module, and the imaging lens assembly module includes an ultra-wide angle camera module 42, a high resolution camera module 43 and a telephoto camera module 44, and the user interface 41 is a touch screen, but the present disclosure is not limited thereto. Furthermore, the imaging lens assembly module includes a plastic light-folding element (not shown) and an optical imaging lens assembly (not shown), wherein the plastic light-folding element is disposed on one of an object side and an image side of the optical imaging lens assembly.

Moreover, the telephoto camera module 44 can be one of the imaging lens assembly modules according to the aforementioned 1st example to the 3rd example, but the present disclosure is not limited thereto. Therefore, it is favorable for satisfying the requirements of the mass production and the appearance of the imaging lens assembly module mounted on the electronic devices according to the current marketplace of the electronic device.

Moreover, users enter a shooting mode via the user interface 41, wherein the user interface 41 is configured to display the scene and have the touch function, and the shooting angle can be manually adjusted to switch the ultra-wide angle camera module 42, the high resolution camera module 43 and the telephoto camera module 44. At this moment, the imaging light is gathered on the image sensor via the imaging lens assembly module, and an electronic signal about an image is output to an image signal processor (ISP) 45.

In FIG. 4B, to meet a specification of the electronic device 40, the electronic device 40 can further include an optical anti-shake mechanism (not shown). Furthermore, the electronic device 40 can further include at least one focusing assisting module (its reference numeral is omitted) and at least one sensing element (not shown). The focusing assisting module can be a flash module 46 for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the electronic device 40 equipped with an auto-focusing mechanism and the optical anti-shake mechanism can be enhanced to achieve the superior image quality. Furthermore, the electronic device 40 according to the present disclosure can have a capturing function with multiple modes, such as taking optimized selfies, high dynamic range (HDR) under a low light condition, 4K resolution recording and so on. Furthermore, the users can visually see a captured image of the camera through the user interface 41 and manually operate the view finding range on the user interface 41 to achieve the autofocus function of what you see is what you get.

Moreover, the imaging lens assembly module, the image sensor, the optical anti-shake mechanism, the sensing element and the focusing assisting module can be disposed on a flexible printed circuit board (FPC) (not shown) and electrically connected to the associated components, such as the imaging signal processor 45, via a connector (not shown) to perform a capturing process. Since the current electronic devices, such as smart phones, have a tendency of being compact, the way of firstly disposing the imaging lens assembly module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the imaging lens assembly module can also be controlled more flexibly via the touch screen of the electronic device. According to the 4th example, the electronic device 40 includes a plurality of sensing elements and a plurality of focusing assisting modules. The sensing elements and the focusing assisting modules are disposed on the flexible printed circuit board and at least one other flexible printed circuit board (not shown) and electrically connected to the associated components, such as the image signal processor 45, via corresponding connectors to perform the capturing process. In other examples (not shown herein), the sensing elements and the focusing assisting modules can also be disposed on the main board of the electronic device or carrier boards of other types according to requirements of the mechanical design and the circuit layout.

Furthermore, the electronic device 40 can further include, but not be limited to, a display, a control unit, a storage unit, a random access memory (RAM), a read-only memory (ROM), or the combination thereof.

Figure 4C:
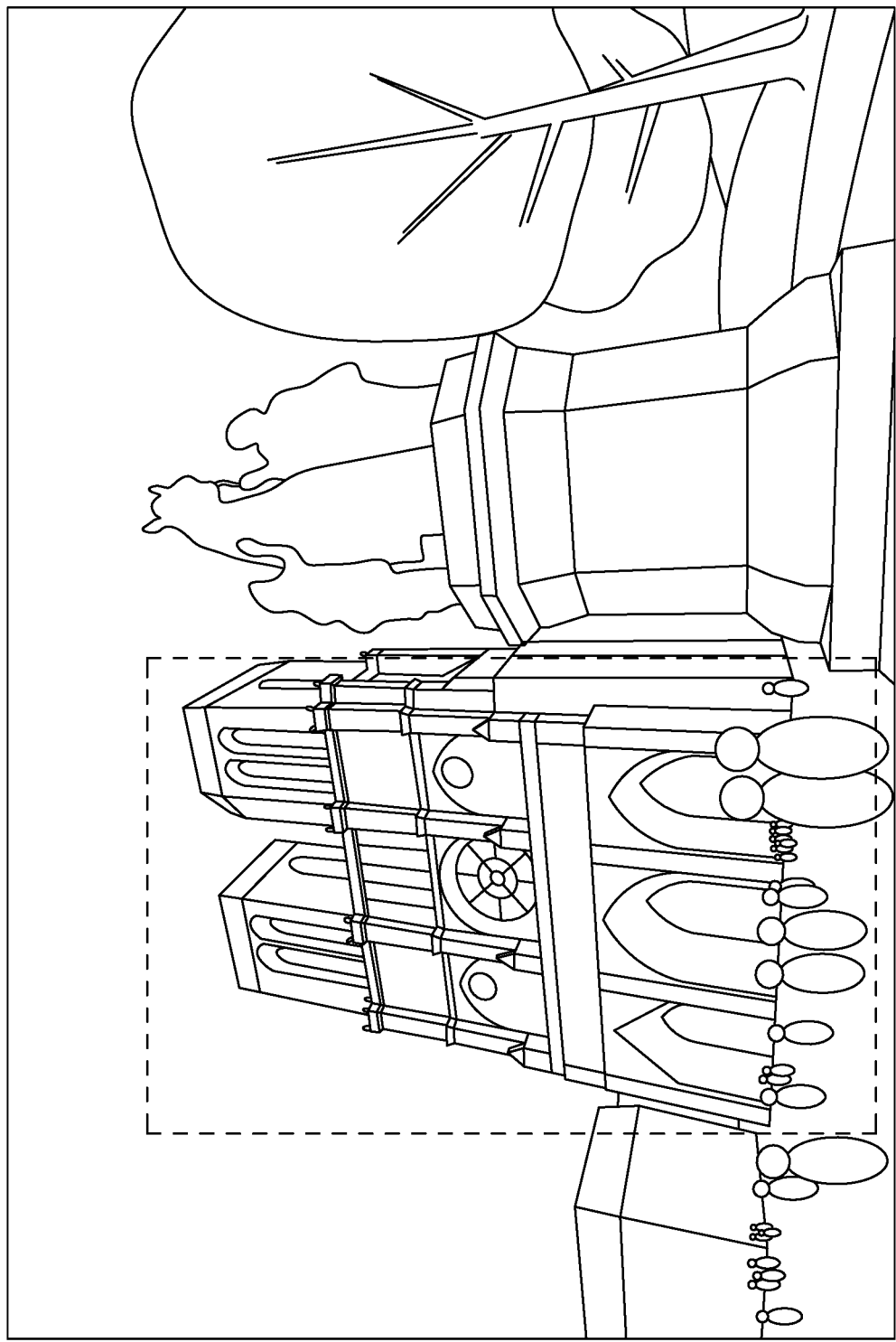
FIG. 4C is a schematic view of an image according to the 4th example in FIG. 4A.

FIG. 4C is a schematic view of an image according to the 4th example in FIG. 4A. In FIG. 4C, the larger range of the image can be captured via the ultra-wide angle camera module 42, and the ultra-wide angle camera module 42 has the function of accommodating more wide range of the scene.

Figure 4D:
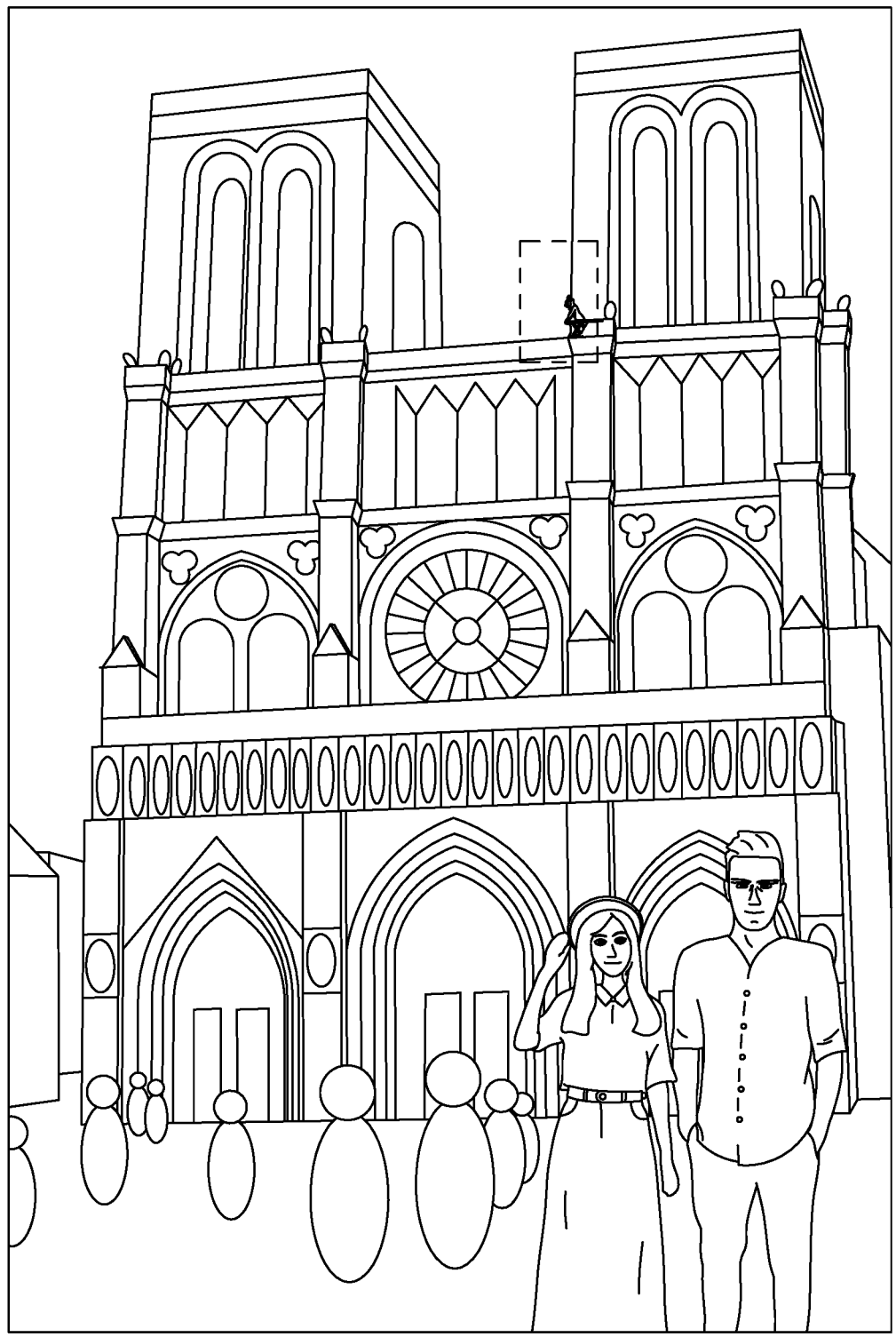
FIG. 4D is another schematic view of an image according to the 4th example in FIG. 4A.

FIG. 4D is another schematic view of an image according to the 4th example in FIG. 4A. In FIG. 4D, the image of the certain range with the high resolution can be captured via the high resolution camera module 43, and the high resolution camera module 43 has the function of the high resolution and the low deformation.

Figure 4E:
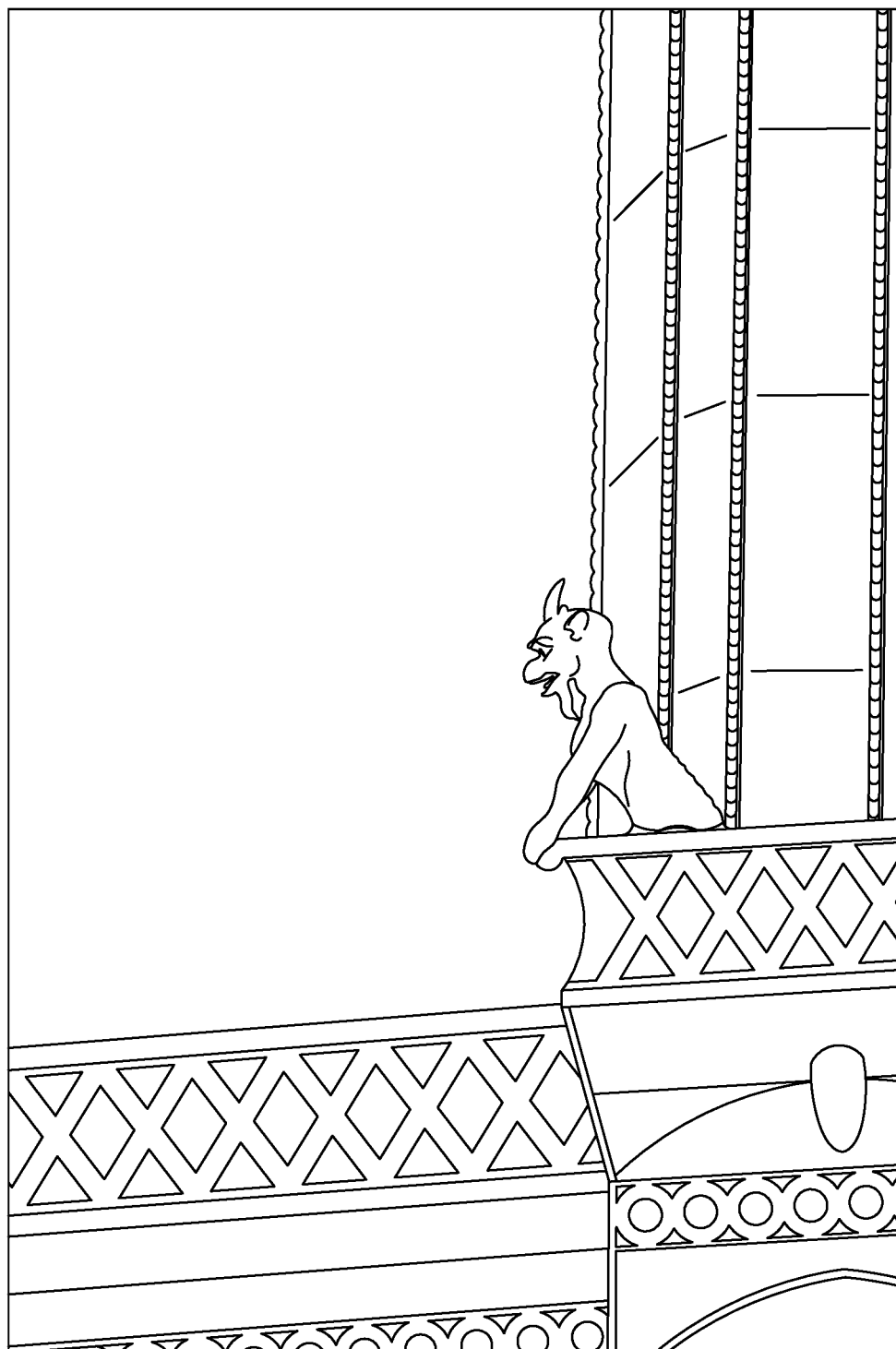
FIG. 4E is still another schematic view of an image according to the 4th example in FIG. 4A.

FIG. 4E is still another schematic view of an image according to the 4th example in FIG. 4A. In FIG. 4E, the telephoto camera module 44 has the enlarging function of the high magnification, and the distant image can be captured and enlarged with high magnification via the telephoto camera module 44.

In FIGS. 4C to 4E, the zooming function can be obtained via the electronic device 40, when the scene is captured via the imaging lens assembly module with different focal lengths cooperated with the function of image processing.

5th Example

Figure 5:
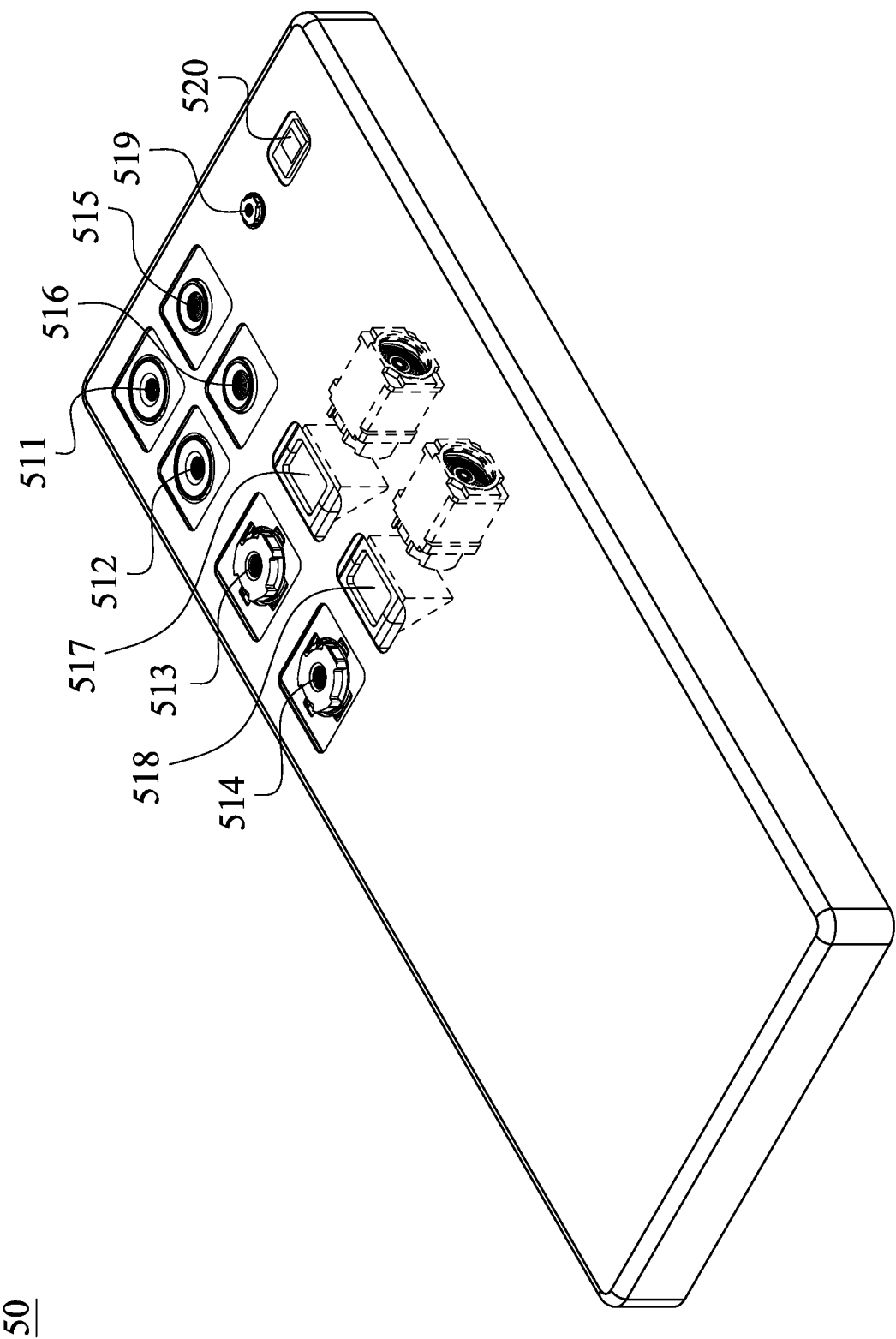
FIG. 5 is a schematic view of an electronic device according to the 5th example of the present disclosure.

FIG. 5 is a schematic view of an electronic device 50 according to the 5th example of the present disclosure. In FIG. 5, the electronic device 50 is a smart phone, and includes an imaging lens assembly module (its reference numeral is omitted) and an image sensor (not shown), wherein the image sensor is disposed on an image surface (not shown) of the imaging lens assembly module, and the imaging lens assembly module includes ultra-wide angle camera modules 511, 512, wide angle camera modules 513, 514, telephoto camera modules 515, 516, 517, 518 and a Time-Of-Flight (TOF) module 519. The TOF module 519 can be another type of the imaging apparatus, and the disposition is not limited thereto.

Moreover, the telephoto camera modules 515, 516, 517, 518 can be one of the imaging lens assembly modules according to the aforementioned 1st example to the 3rd example, but the present disclosure is not limited thereto. Therefore, it is favorable for satisfying the requirements of the mass production and the appearance of the imaging lens assembly module mounted on the electronic devices according to the current marketplace of the electronic device.

Further, the telephoto camera modules 517, 518 are configured to fold the light, but the present disclosure is not limited thereto.

To meet a specification of the electronic device 50, the electronic device 50 can further include an optical anti-shake mechanism (not shown). Furthermore, the electronic device 50 can further include at least one focusing assisting module (not shown) and at least one sensing element (not shown). The focusing assisting module can be a flash module 520 for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the electronic device 50 equipped with an auto-focusing mechanism and the optical anti-shake mechanism can be enhanced to achieve the superior image quality. Furthermore, the electronic device 50 according to the present disclosure can have a capturing function with multiple modes, such as taking optimized selfies, High Dynamic Range (HDR) under a low light condition, 4K Resolution recording and so on.

Further, all of other structures and dispositions according to the 5th example are the same as the structures and the dispositions according to the 4th example, and will not be described again herein.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. A plastic light-folding element, comprising:
   an incident surface configured to lead an imaging light enter the plastic light-folding element;
   an exit surface configured to lead the imaging light exit the plastic light-folding element;
   a reflective surface configured to fold the imaging light;
   a reflective optical layer disposed on a surface of the reflective surface, and comprising:
   an Ag layer configured to lead the imaging light, which enters the incident surface, reflect to the exit surface;
   a bottom layer optical film directly contacted with the Ag layer, and the bottom layer optical film closer to the reflective surface of the plastic light-folding element than the Ag layer to the reflective surface of the plastic light-folding element; and
   a top layer optical film, a refractive index of the top layer optical film lower than a refractive index of the bottom layer optical film, wherein the top layer optical film is not directly contacted with the Ag layer, and the top layer optical film is farther from the reflective surface of the plastic light-folding element than the Ag layer from the reflective surface of the plastic light-folding element; and
   at least one intermediate layer disposed between the top layer optical film and the Ag layer, and the at least one intermediate layer directly contacted to the Ag layer, wherein there is no layer disposed between the at least one intermediate layer and the Ag layer, the at least one intermediate layer comprises a metal layer excluding a silver atom, and a material of the metal layer is Ti, Cr, Ni or one of an oxide of Cr and Ni;
   wherein the refractive index of the bottom layer optical film is Nb, a thickness of the bottom layer optical film is db, the refractive index of the top layer optical film is Nt, a thickness of the top layer optical film is dt, a thickness of the Ag layer is dAg, and the following conditions are satisfied:

$1.4<Nt<Nb<2.1$;

$1.6<Nb<2.1$;

$1.4<Nt<1.58$;

$0.05<db/dAg<1.2$; and $0.2<dAg/dt<3.5$.

2. The plastic light-folding element of claim 1, further comprising:
   a connecting surface connected to the incident surface, the exit surface and the reflective surface; and
   a gate vestige structure disposed on the connecting surface.

3. The plastic light-folding element of claim 2, wherein the bottom layer optical film is a metal oxide layer.

4. The plastic light-folding element of claim 2, wherein the thickness of the Ag layer is dAg, and the following condition is satisfied:

$75\ \text{nm}<dAg<200\ \text{nm}$.

5. The plastic light-folding element of claim 2, wherein the bottom layer optical film is directly contacted with the reflective surface of the plastic light-folding element.

6. The plastic light-folding element of claim 2, wherein the thickness of the bottom layer optical film is db, the thickness of the top layer optical film is dt, and the following condition is satisfied:

$0.05<db/dt<1.1$.

7. The plastic light-folding element of claim 2, wherein a lowest reflectivity of a reflectivity of the reflective optical layer between wavelengths of 540 nm to 590 nm is R5459, and the following condition is satisfied:

$94.0\%<R5459<99.99\%$.

8. An imaging lens assembly module, comprising:
   the plastic light-folding element of claim 1; and
   an optical imaging lens assembly, the plastic light-folding element disposed on one of an object side and an image side of the optical imaging lens assembly.

9. An electronic device, comprising:
   the imaging lens assembly module of claim 8; and
   an image sensor disposed on an image surface of the imaging lens assembly module.

* * * * *